US008606604B1

(12) United States Patent
Huber et al.

(10) Patent No.: US 8,606,604 B1
(45) Date of Patent: Dec. 10, 2013

(54) SYSTEMS AND METHODS FOR REMOTE ELECTRONIC TRANSACTION PROCESSING

(76) Inventors: David L. Huber, Coto de Caza, CA (US); Frederick J. Morgan, Coto de Caza, CA (US)

( * ) Notice: Subject to any disclaimer, the term of this patent is extended or adjusted under 35 U.S.C. 154(b) by 1292 days.

(21) Appl. No.: 12/157,709

(22) Filed: Jun. 12, 2008

Related U.S. Application Data

(60) Provisional application No. 60/934,406, filed on Jun. 12, 2007.

(51) Int. Cl.
*G06Q 40/00* (2012.01)

(52) U.S. Cl.
USPC ............ 705/4; 379/91.01; 382/116; 705/1.1; 705/14.53; 705/26.1; 705/37; 705/38; 705/65; 705/80

(58) Field of Classification Search
None
See application file for complete search history.

(56) References Cited

U.S. PATENT DOCUMENTS

| | | | | |
|---|---|---|---|---|
| 5,357,563 | A * | 10/1994 | Hamilton et al. | 379/91.01 |
| 5,602,933 | A * | 2/1997 | Blackwell et al. | 382/116 |
| 6,186,793 | B1 * | 2/2001 | Brubaker | 434/107 |
| 7,340,439 | B2 * | 3/2008 | Burger et al. | 705/65 |
| 7,392,201 | B1 * | 6/2008 | Binns et al. | 705/4 |
| 7,409,357 | B2 * | 8/2008 | Schaf et al. | 705/7.28 |
| 7,698,213 | B2 * | 4/2010 | Lancaster | 705/38 |
| 7,769,609 | B1 * | 8/2010 | Woll | 705/4 |
| 2002/0046053 | A1 * | 4/2002 | Hare et al. | 705/1 |
| 2003/0046153 | A1 * | 3/2003 | Robibero | 705/14 |
| 2003/0083908 | A1 * | 5/2003 | Steinmann | 705/4 |
| 2003/0101132 | A1 * | 5/2003 | Gaubatz et al. | 705/38 |
| 2003/0236741 | A1 * | 12/2003 | Kubo et al. | 705/38 |
| 2004/0153423 | A1 * | 8/2004 | Yamasaki | 705/80 |
| 2004/0230460 | A1 * | 11/2004 | Thomas et al. | 705/4 |
| 2004/0236676 | A1 * | 11/2004 | Takezawa et al. | 705/38 |
| 2005/0038682 | A1 * | 2/2005 | Gandee et al. | 705/4 |
| 2005/0055250 | A1 * | 3/2005 | Kopold et al. | 705/4 |
| 2005/0222945 | A1 * | 10/2005 | Pannicke et al. | 705/39 |
| 2006/0015435 | A1 * | 1/2006 | Nathanson | 705/37 |
| 2006/0293926 | A1 * | 12/2006 | Khury | 705/4 |
| 2007/0043656 | A1 * | 2/2007 | Lancaster | 705/38 |
| 2008/0071676 | A1 * | 3/2008 | Vagim et al. | 705/38 |
| 2008/0235038 | A1 * | 9/2008 | Szamel | 705/1 |
| 2009/0198523 | A1 * | 8/2009 | Grieder et al. | 705/4 |
| 2009/0271294 | A1 * | 10/2009 | Hadi | 705/27 |

FOREIGN PATENT DOCUMENTS

WO WO 98/26530 * 6/1998 ............. H04J 13/00

OTHER PUBLICATIONS

Matthew French, One Card for All Charges, The Pocket Vaults, Mass High Tech—The Journal of New England Technology, Apr. 9, 2001.*

* cited by examiner

*Primary Examiner* — Robert Niquette

(57) ABSTRACT

Embodiments of systems and methods for enabling communication between vendors and individuals qualified to offer financial products, insurance products, warranty products, and/or other products and services related to vehicles and vehicle sales are provided. In one embodiment, a salesperson at a remote location interacts with the vendor's customer using data, video, and/or audio transmissions over a network. In one embodiment, the remote salesperson may possess relevant expertise or training, which the salesperson uses to process the transaction. In one embodiment, the remote salesperson completes the transaction using a system that manages the transaction and communication.

11 Claims, 51 Drawing Sheets

| First Name | Joshua | | DL # | | Sam | ▼ |
| Middle Name | | | | | | |
| Last Name | Mac | | Exp Date | | ▼ | |
| Suffix | ▼ | | | | | |
| | | | Email | | | |

Phone Information

| | Phone Type | Number / Ext | Status |
|---|---|---|---|
| | Home | 213-555-5555 | Current |

Address Information

| | Address | City, State, Zip County | Status | Time at address |
|---|---|---|---|---|
| | 123 Oakbrook | Long Beach, Ca 92815<br>LA | Current | • Years<br>• Months |

FIG. 4C

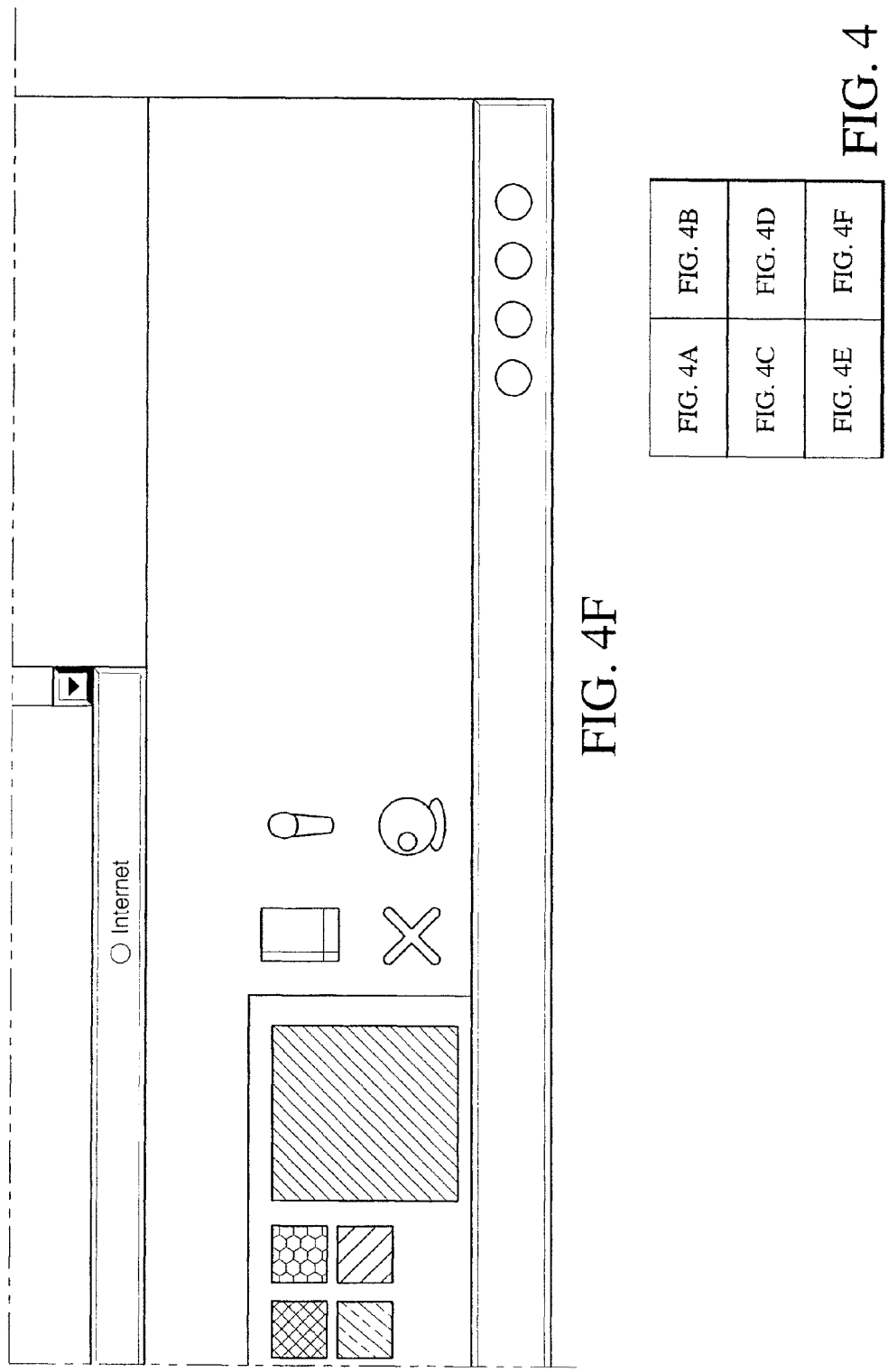

FIG. 5A₁

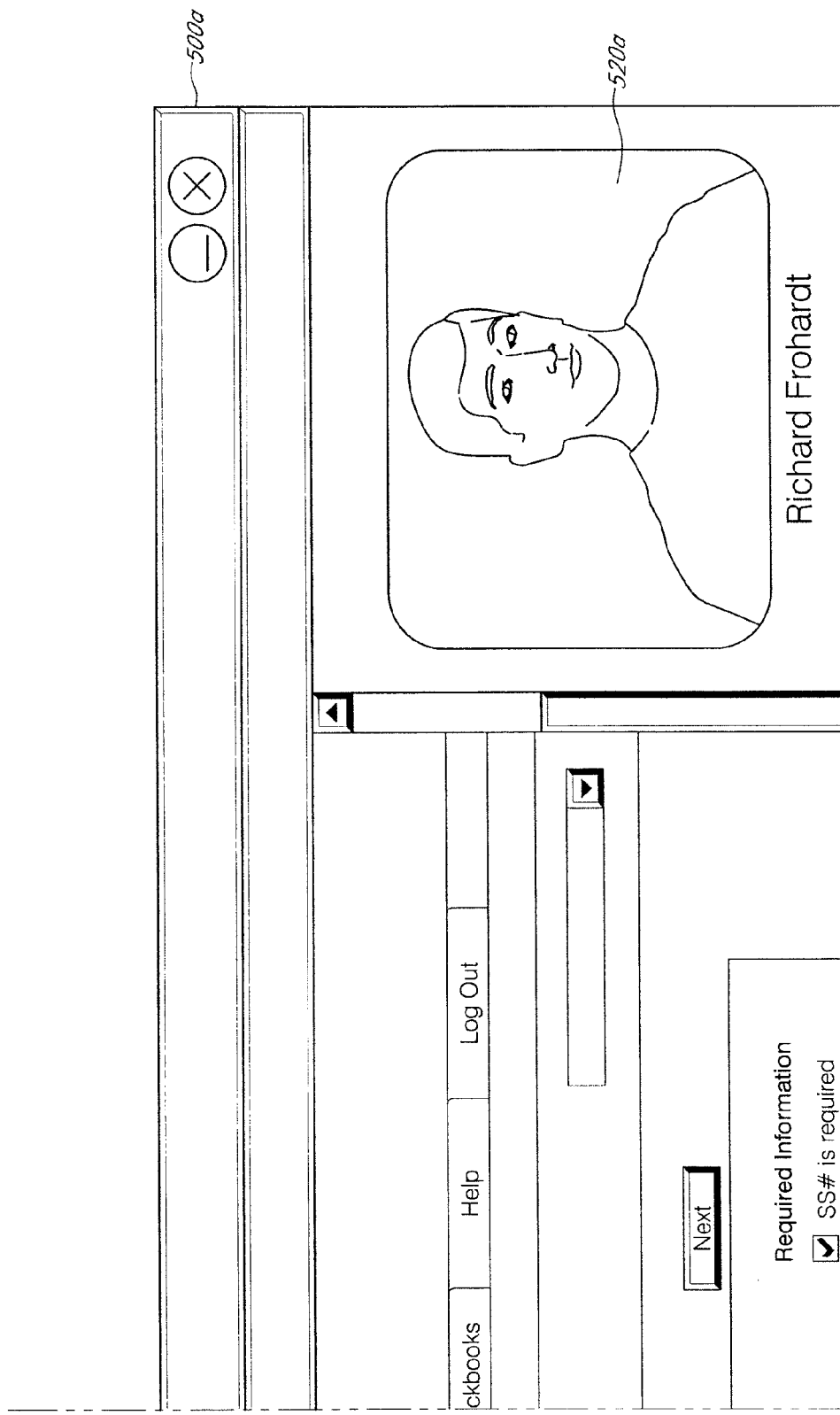
FIG. 5A₂

| First Name | Joshua | | DL # | | ▶ |
|---|---|---|---|---|---|
| Middle Name | | | Exp Date | ▶ | |
| Last Name | Mac | | | | |
| Suffix | ▶ | | Email | | |

Phone Information

| | Phone Type | Number / Ext | Status |
|---|---|---|---|
| | Home | 213-555-5555 | Current |

Address Information

| | Address | City, State, Zip County | Status | Time at address • Years • Months |
|---|---|---|---|---|
| | 123 Oakbrook | Long Beach, Ca 92815 LA | Current | |

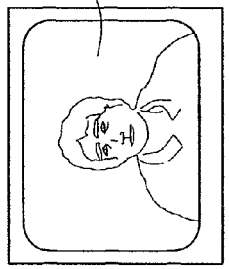
FIG. 5A₄

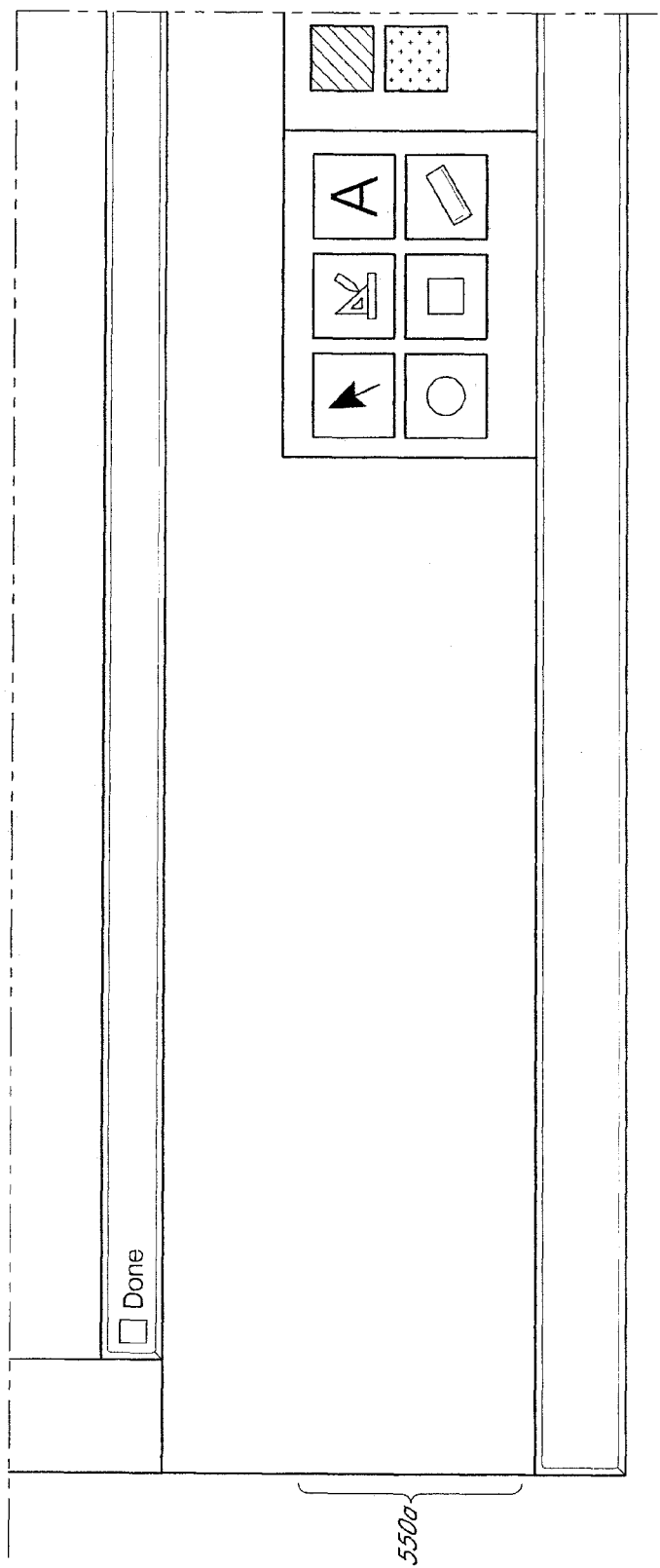
FIG. 5A5

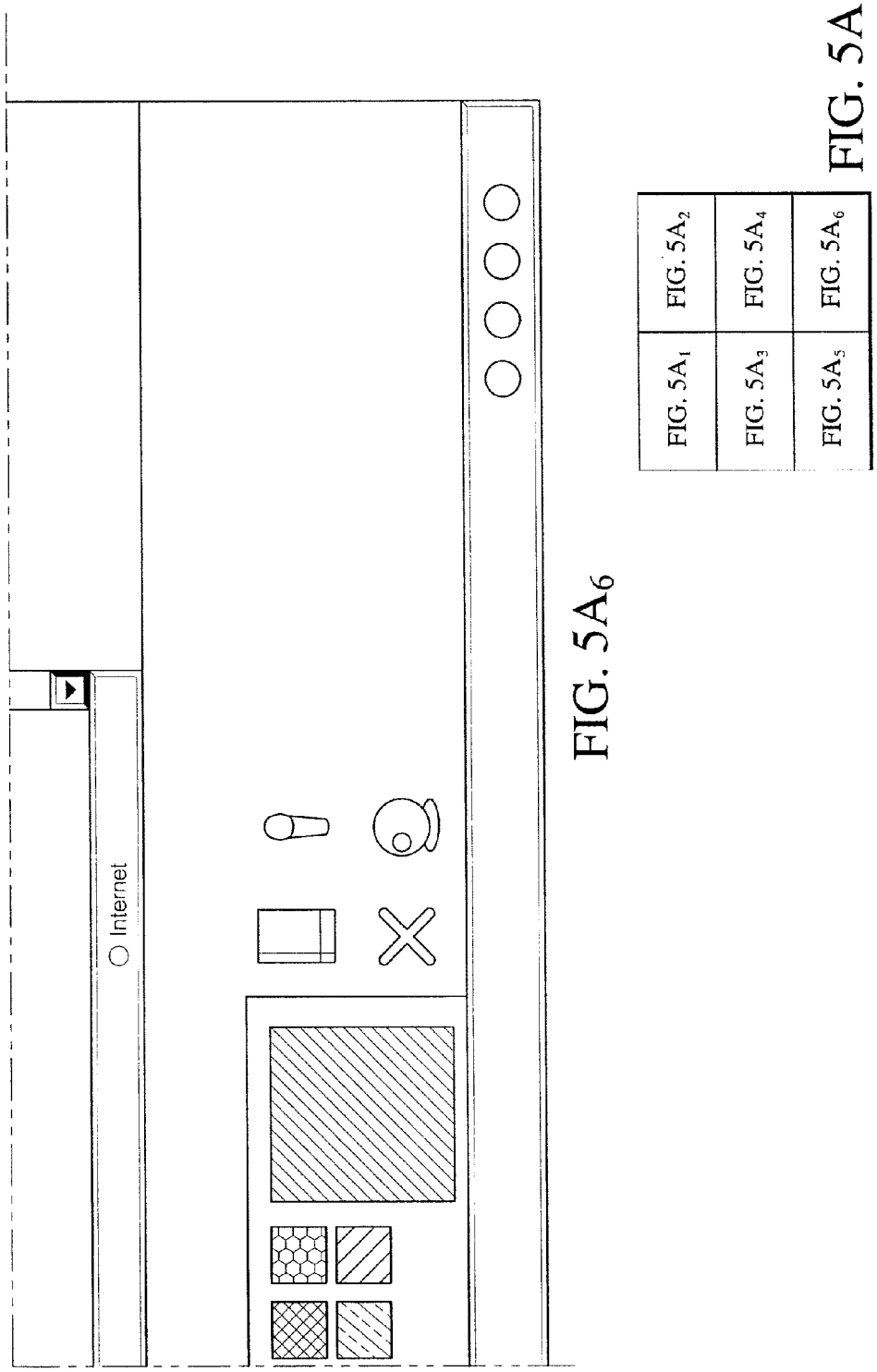

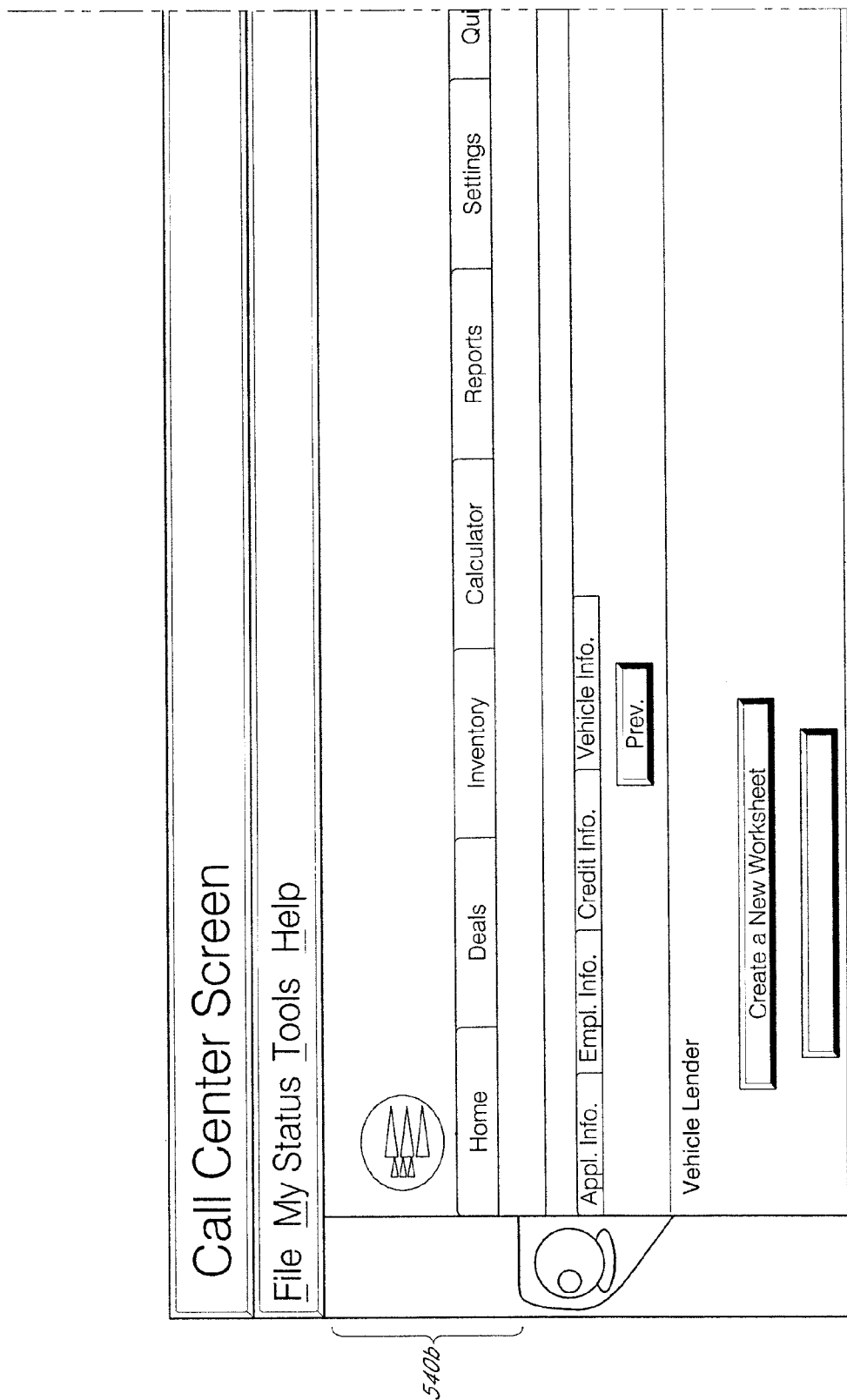
FIG. 5B₁

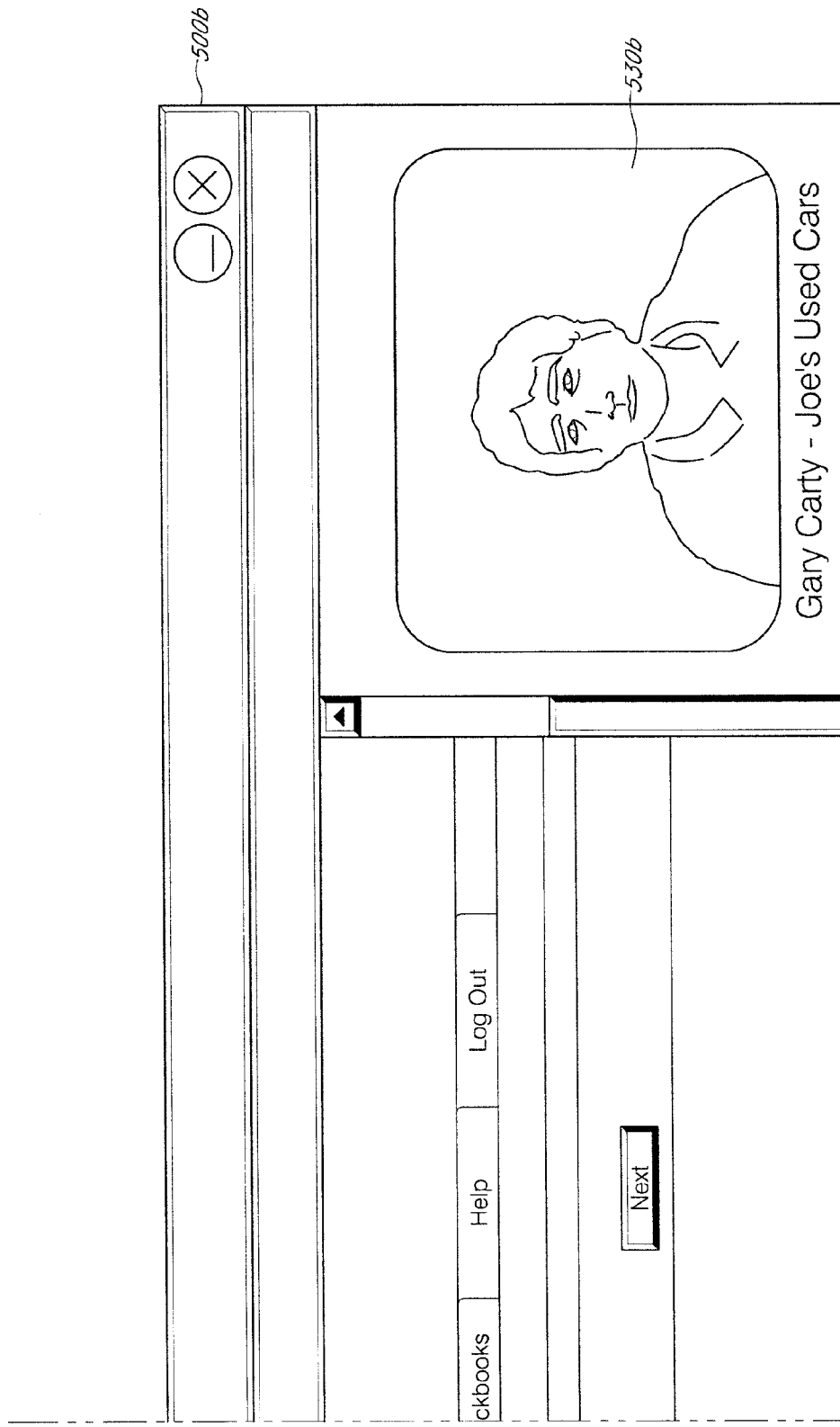
FIG. 5B₂

| Lender | Vehicle | | |
|---|---|---|---|
| A<br>Loan Office<br>Phone # | 2006 Honda Civic<br>Vin A | | Current Deal<br>Date June 8, 2007 3:50 pm<br>Sales Price $13,000.00<br>Amt. Financed $8,000.00<br>Down Payment $5,000.00<br>Rate 7.8%<br>Num Payments<br>Res. Amount<br>Buy Rate<br>Acq. Fee<br>Discount<br>Discount %<br>Mileage<br>Model<br>Call Back |
| B<br>Loan Office<br>Phone # | 2001 Hyundai Elantra<br>Vin B | | Current Deal<br>Date June 8, 2007 10:50 am<br>Sales Price<br>Amt. Financed<br>Down Payment<br>Rate<br>Num Payments<br>Res. Amount<br>Buy Rate<br>Acq. Fee<br>Discount<br>Discount % |

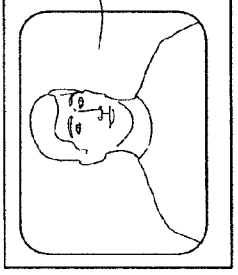
FIG. 5B₄

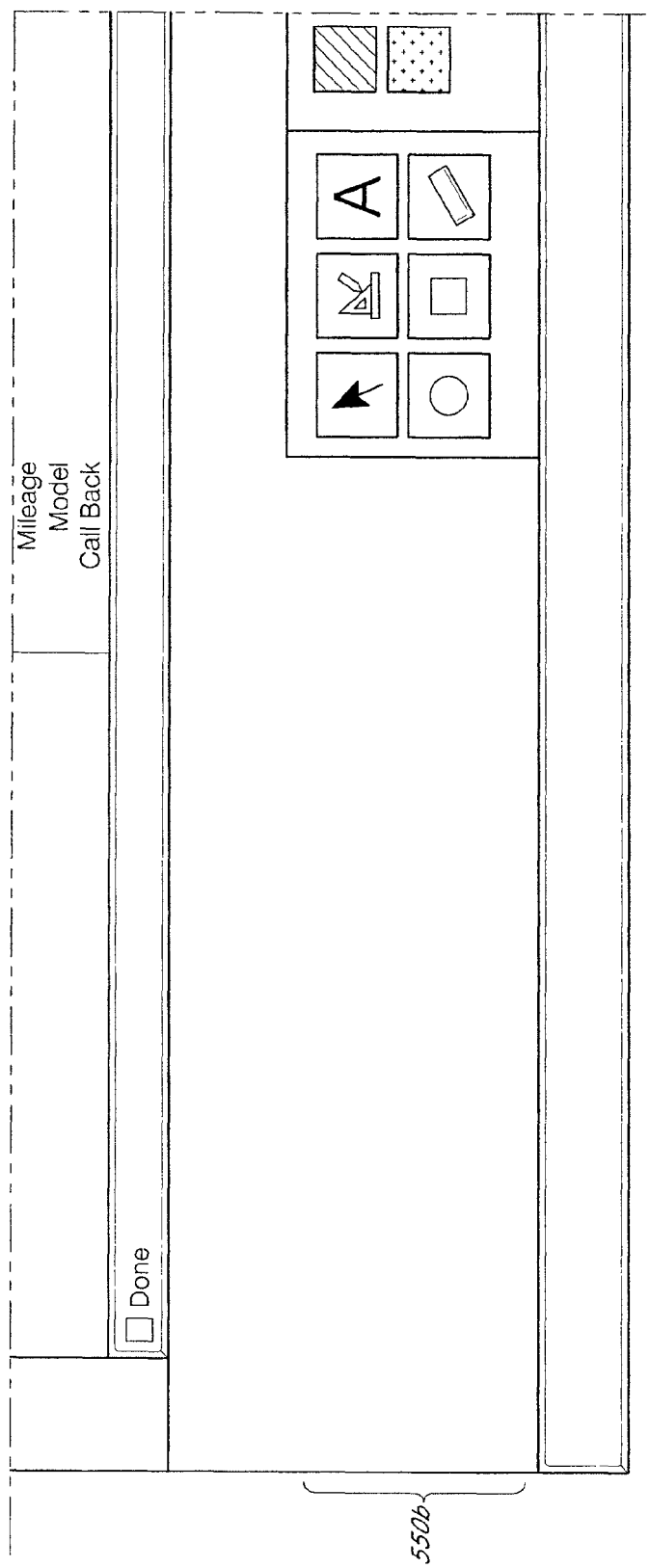
FIG. 5B₅

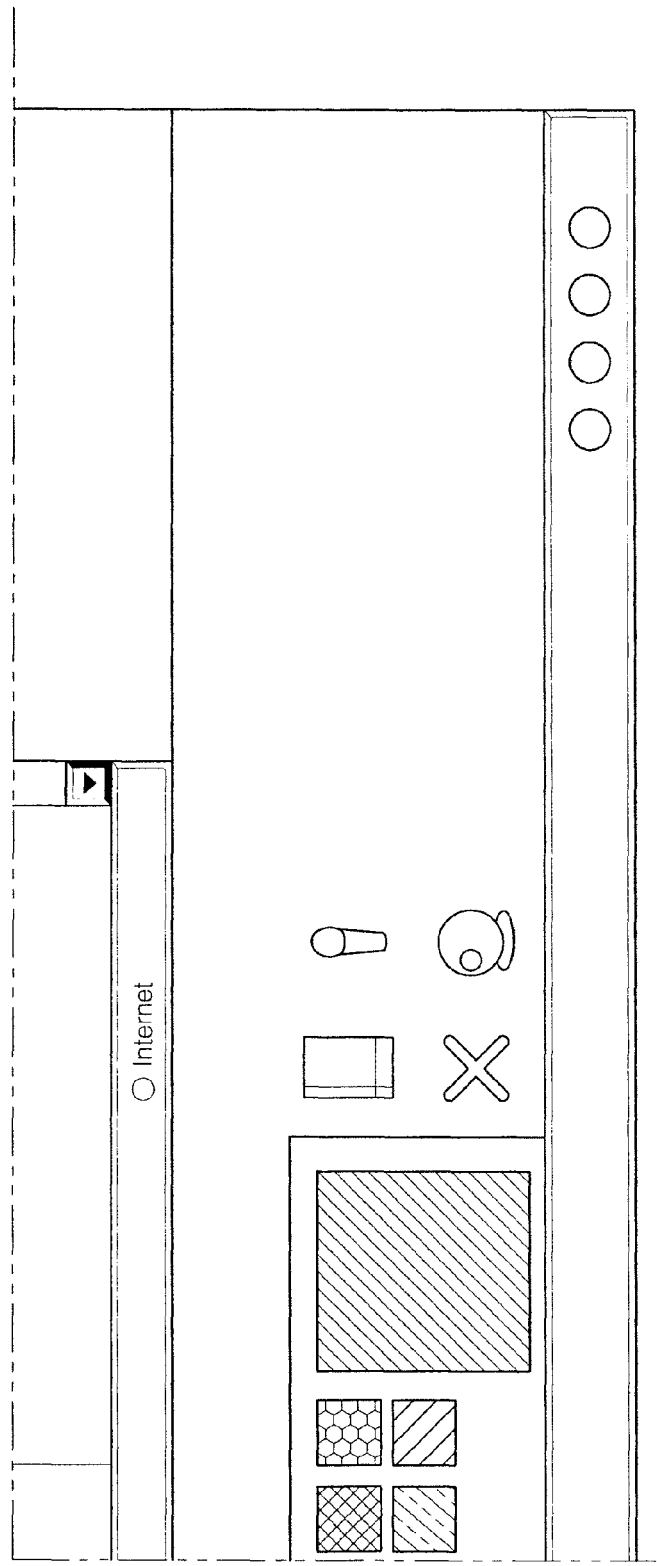
FIG. 5B$_6$

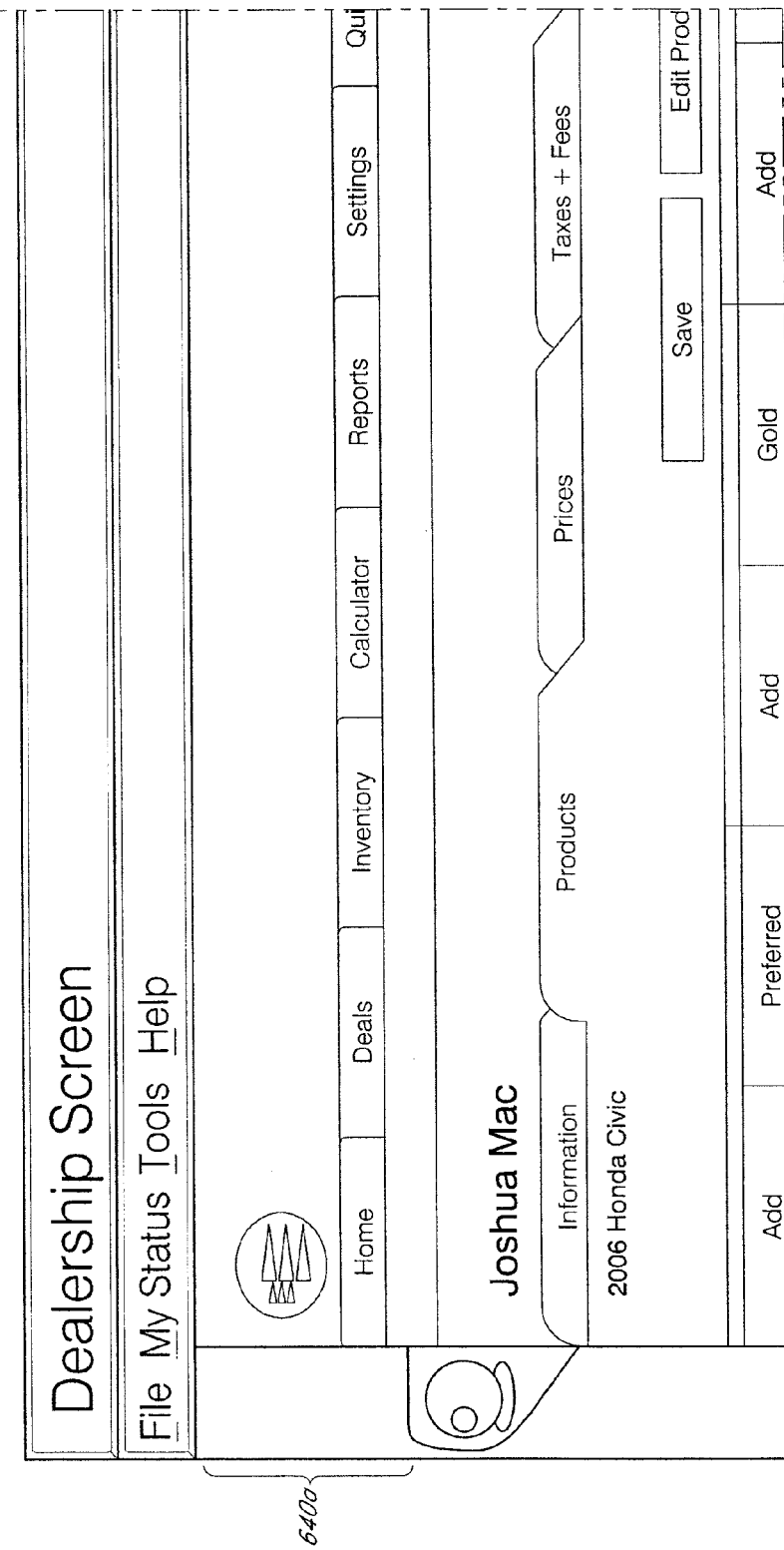
FIG. 6A₁

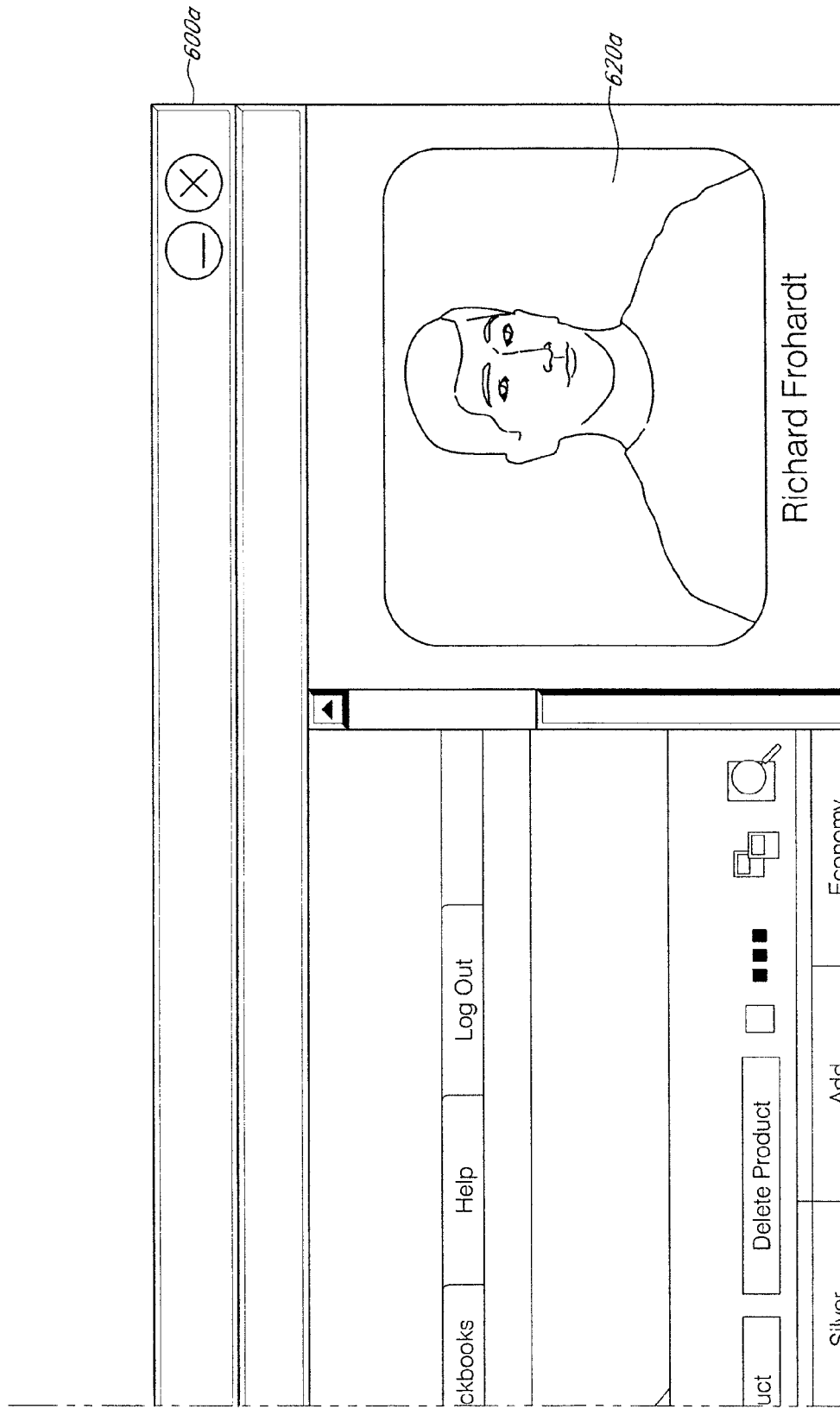
FIG. 6A₂

☐ Vehicle Protection Plan

- Rental Car Coverage
- Towing Coverage
- Travel Coverage
- $100 deductible

☐ Car Care Service Plan

- Premium Care Plus Plan
- Service every 3000 miles
- Lube, Oil and Filter
- Tire Rotation
- Multi Point Vehicle Inspection $336.75 / month ☐ Vehicle Protection Plan

- Rental Car Coverage
- Towing Coverage
- Travel Coverage
- $200 deductible

☐ Car Care Service Plan

- Premium Care Plus Plan
- Service every 5000 miles
- Lube, Oil and Filter
- Tire Rotation
- Multi Point Vehicle Inspection $327.22 / month ☐ Vehicle Protection

- Rental Car Coverage
- Towing Coverage
- Travel Coverage
- $300 deductible

☐ Car Care Service

- Premium Care Plus
- Service every 8000 miles
- Lube, Oil and Filter
- Tire Rotation
- Multi Point Vehicle Inspection $286.22 / month

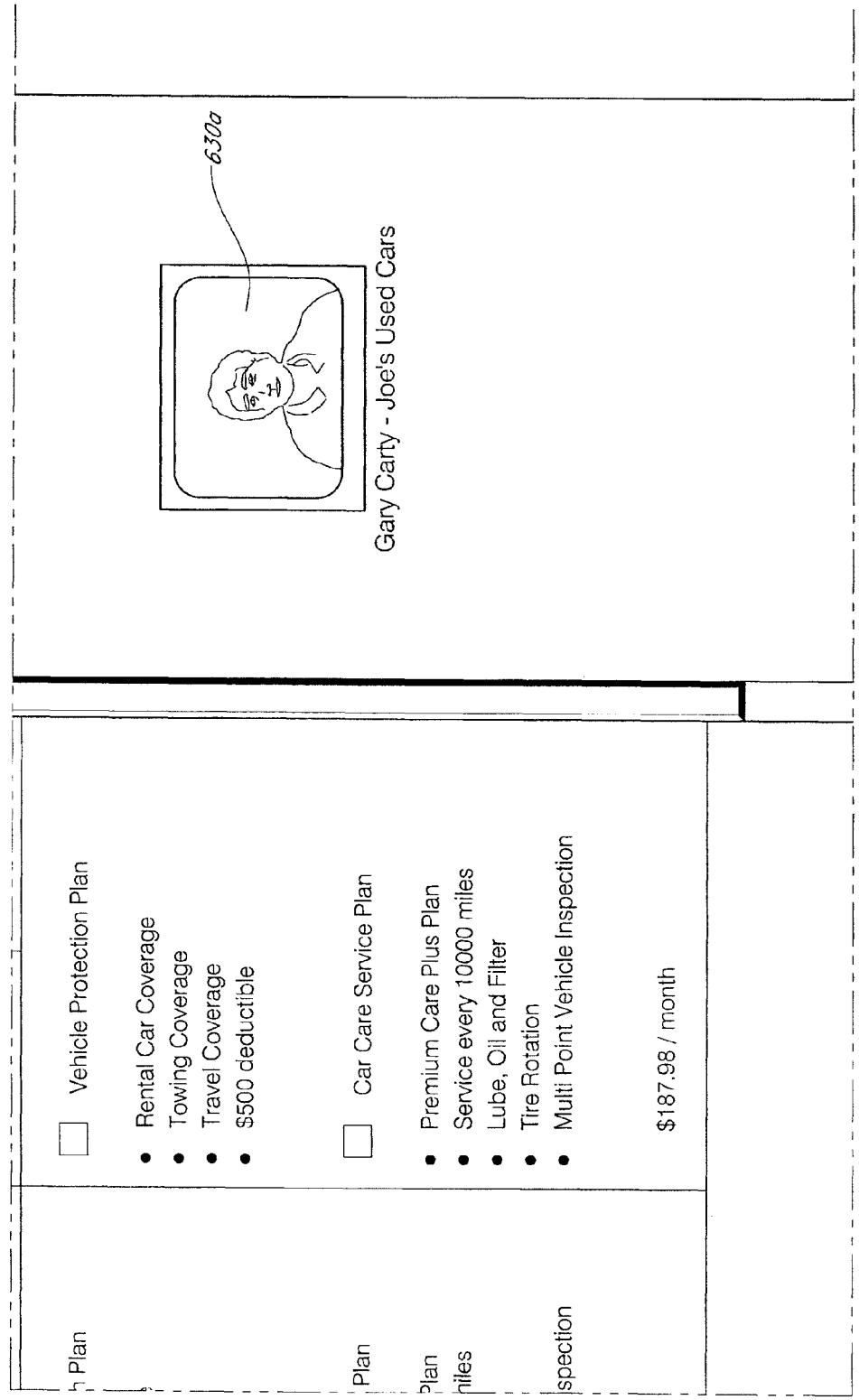
FIG. 6A₄

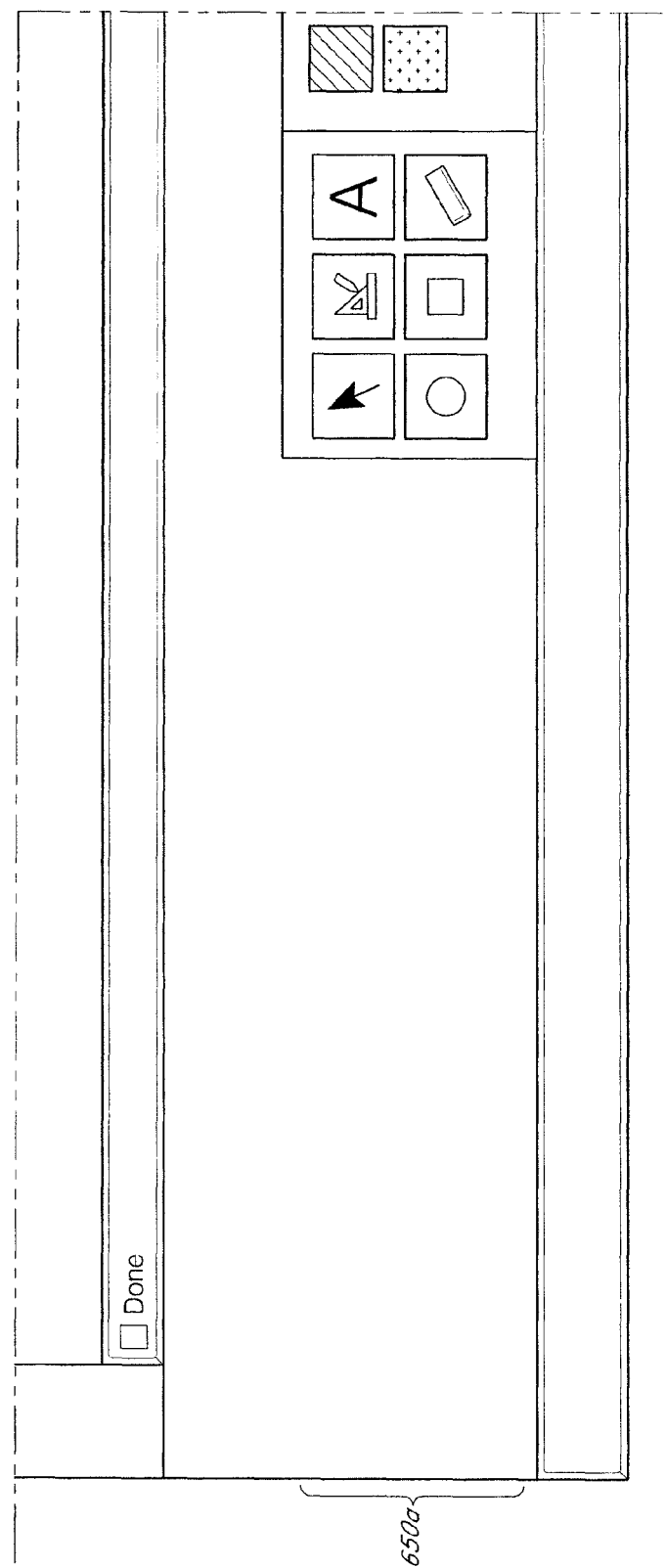
FIG. 6A₅

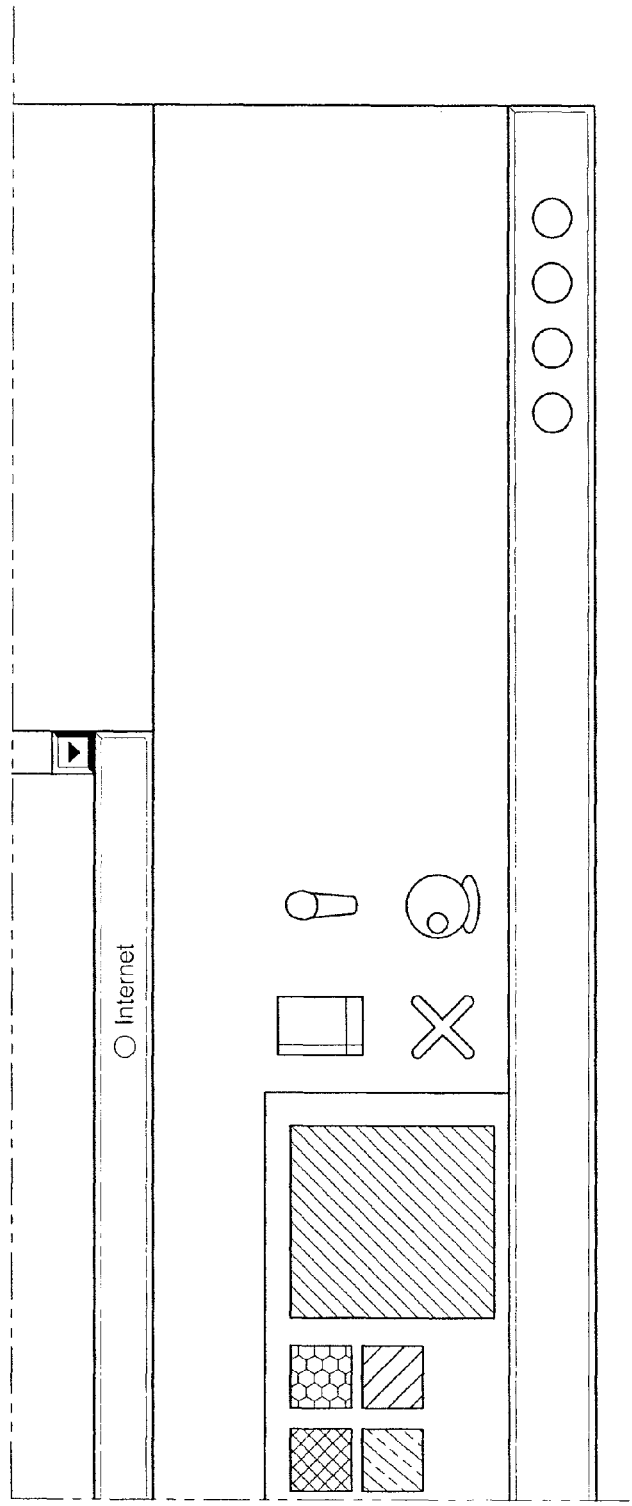
FIG. 6A6

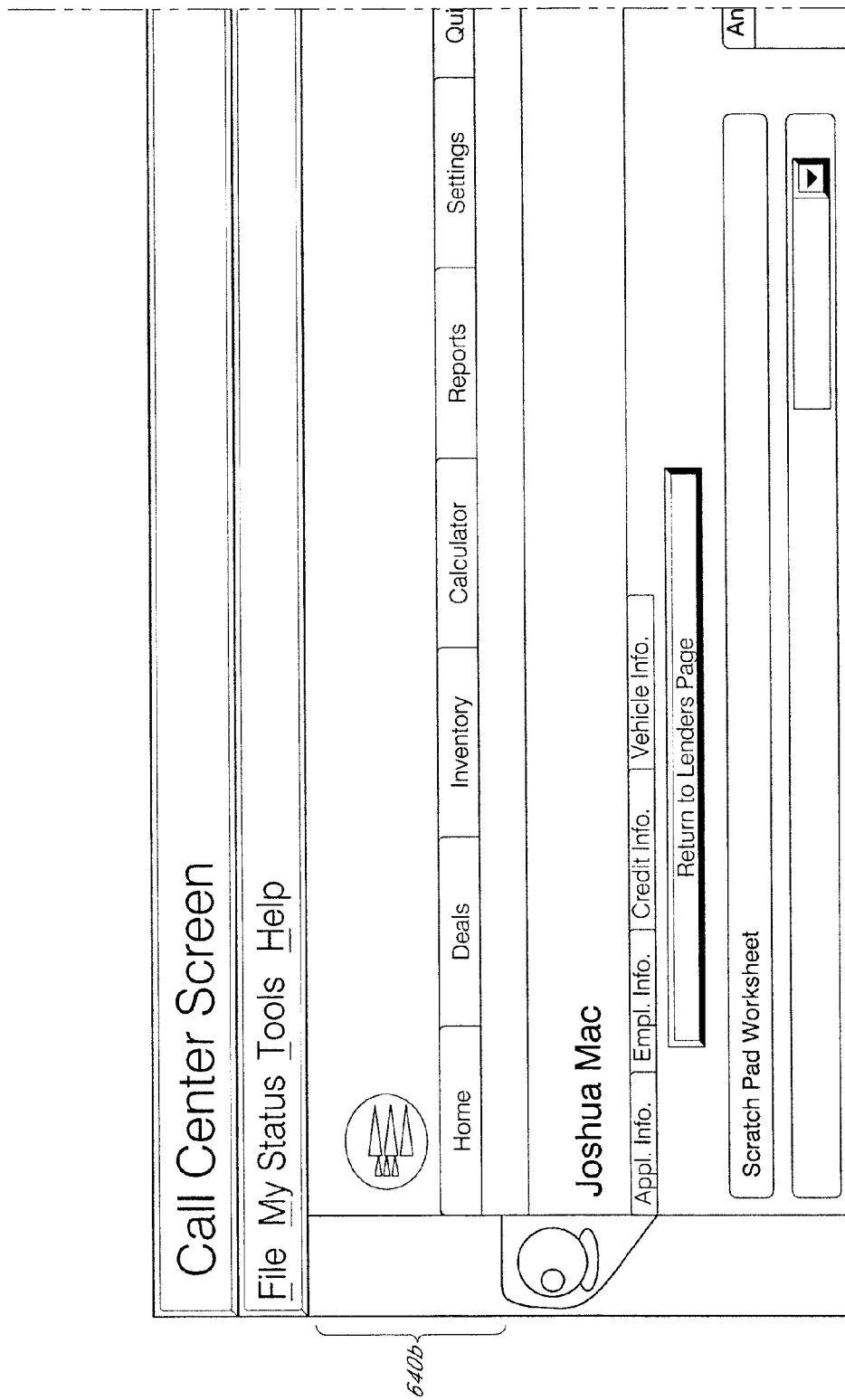
FIG. 6B₁

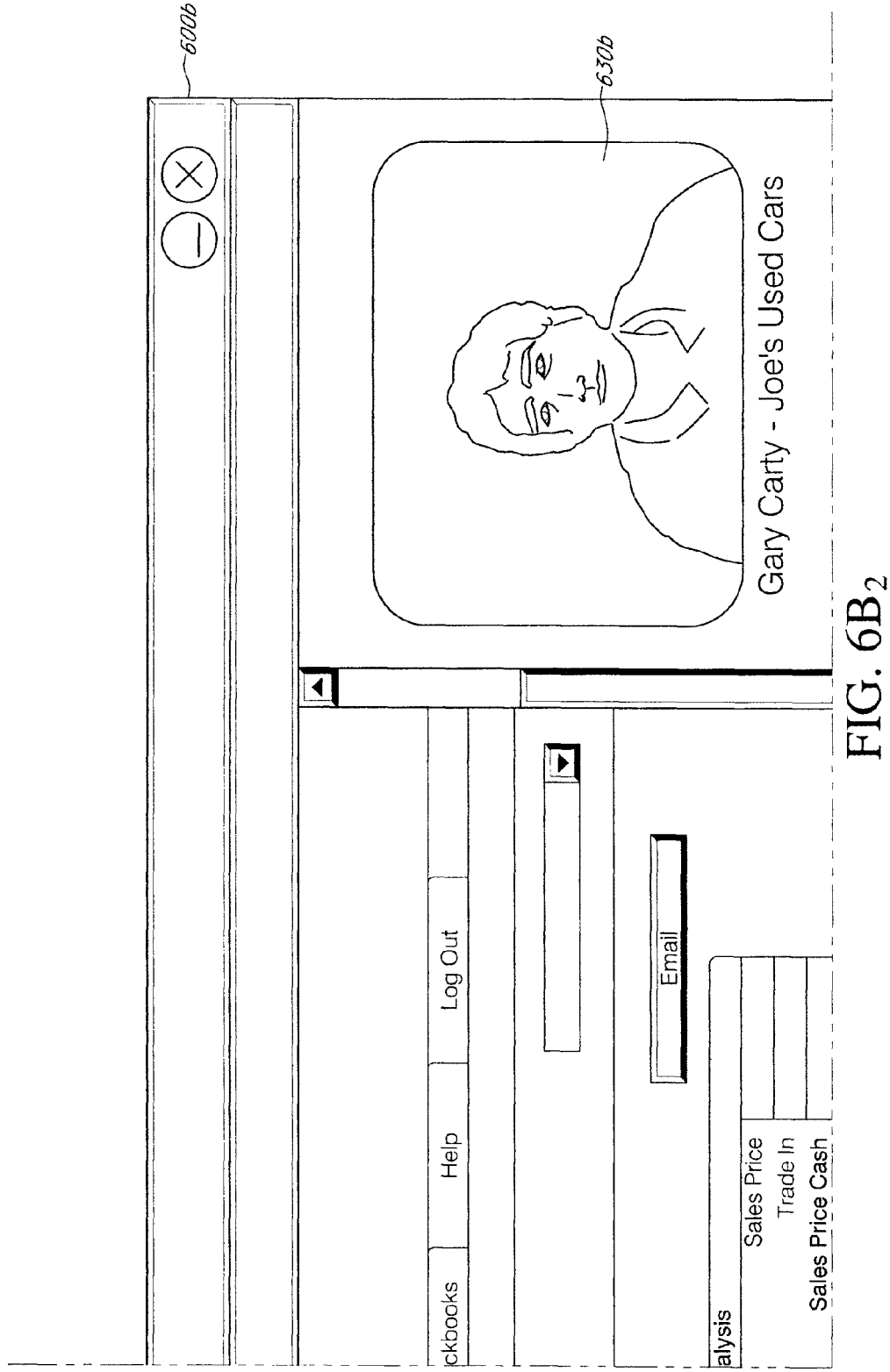
FIG. 6B₂

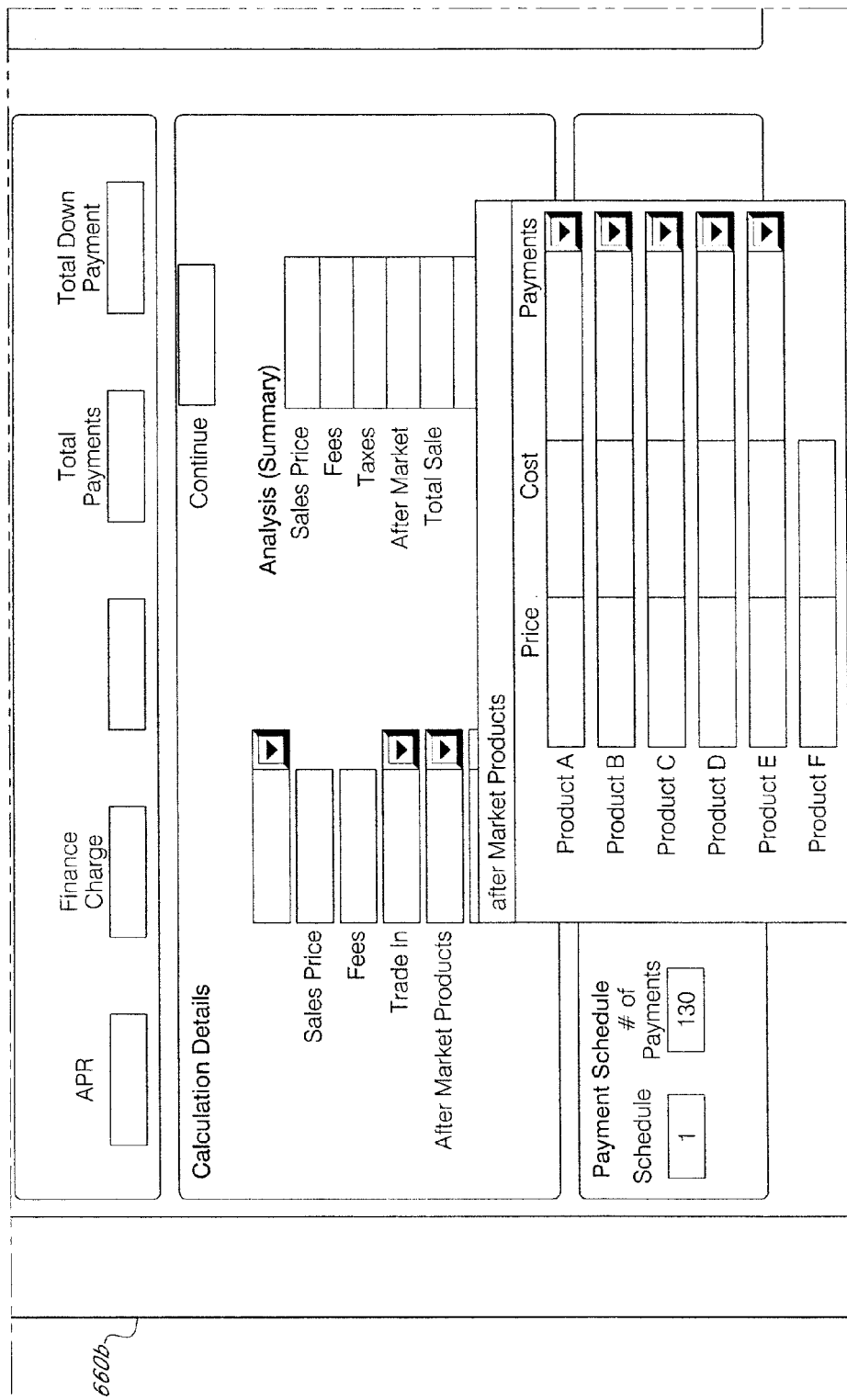
FIG. 6B₃

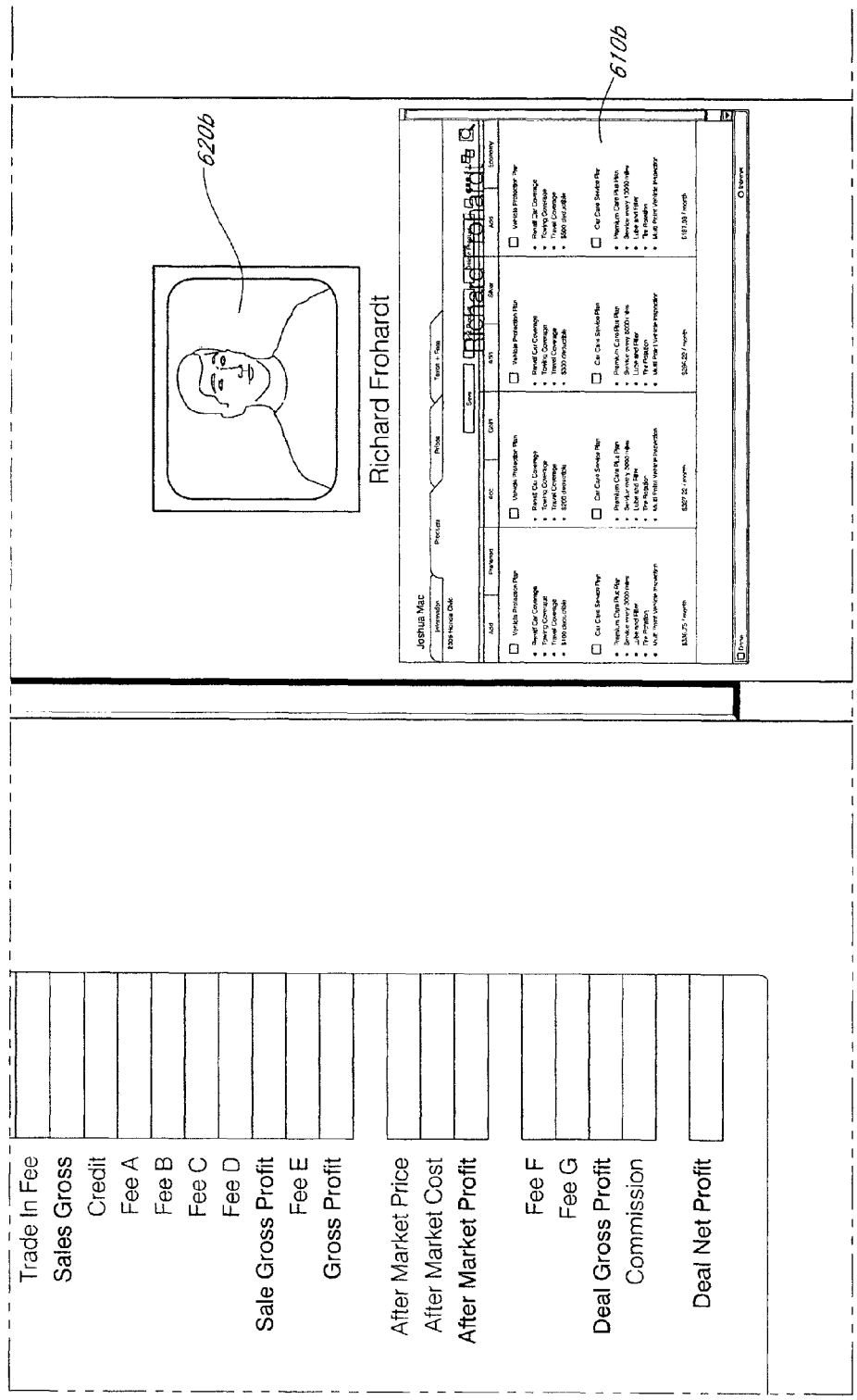
FIG. 6B₄

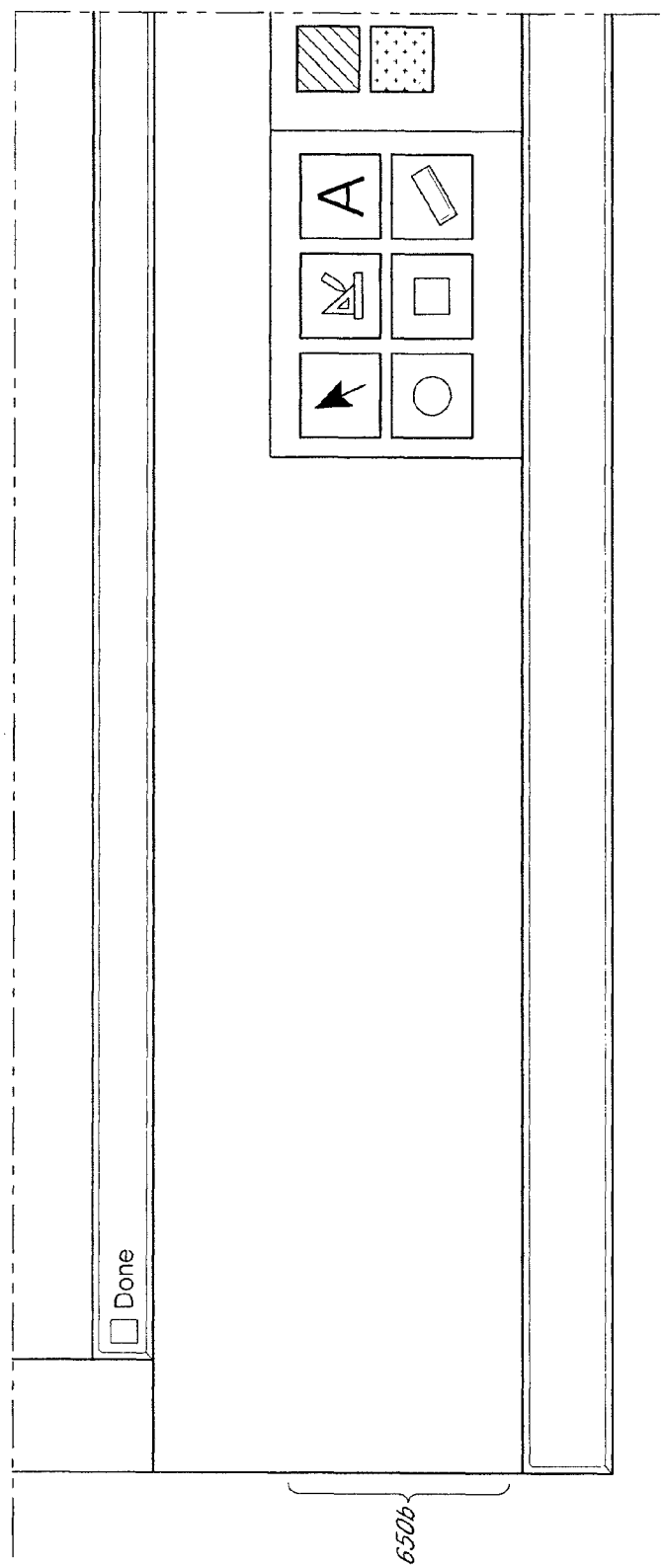
FIG. 6B₅

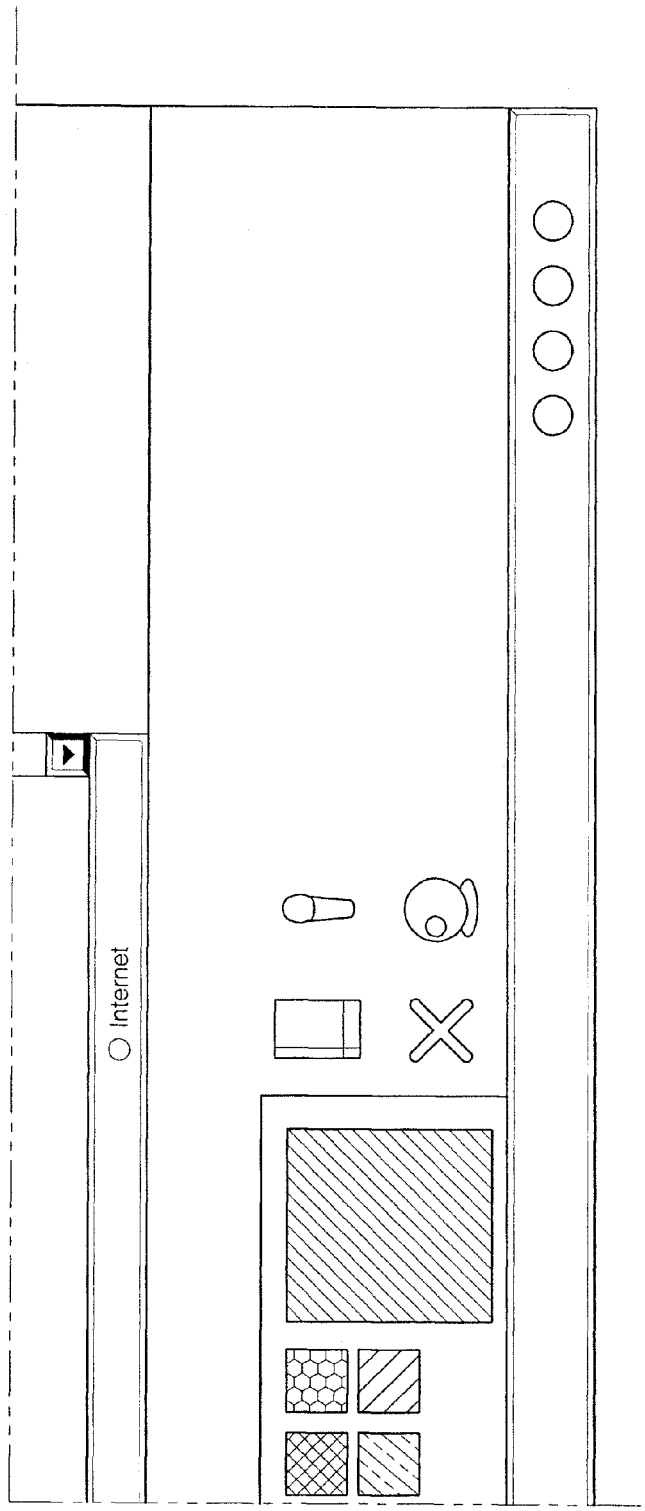
FIG. 6B6

FIG. 7A₁

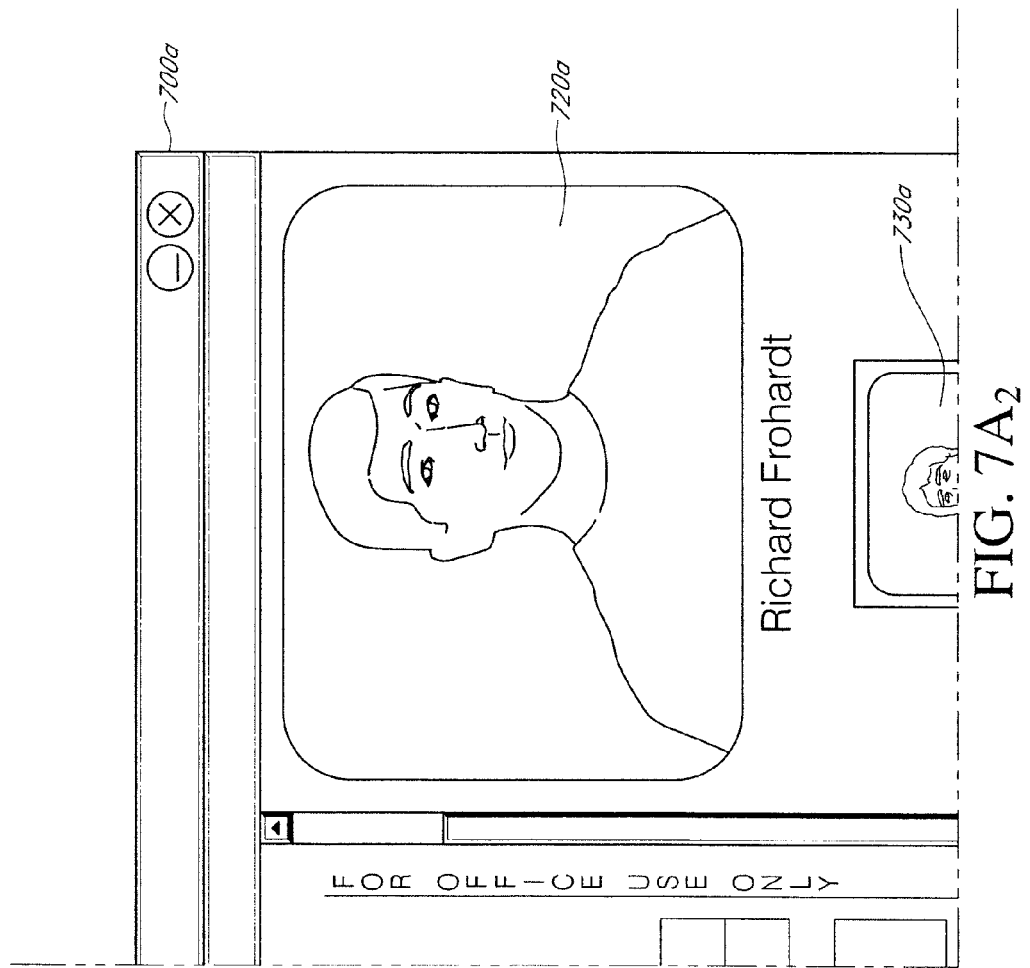

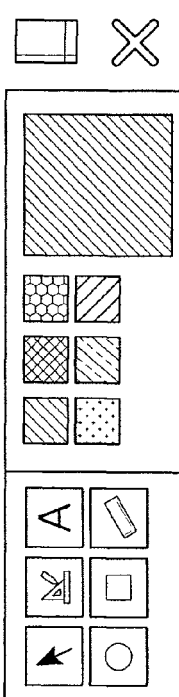
FIG. 7A₃

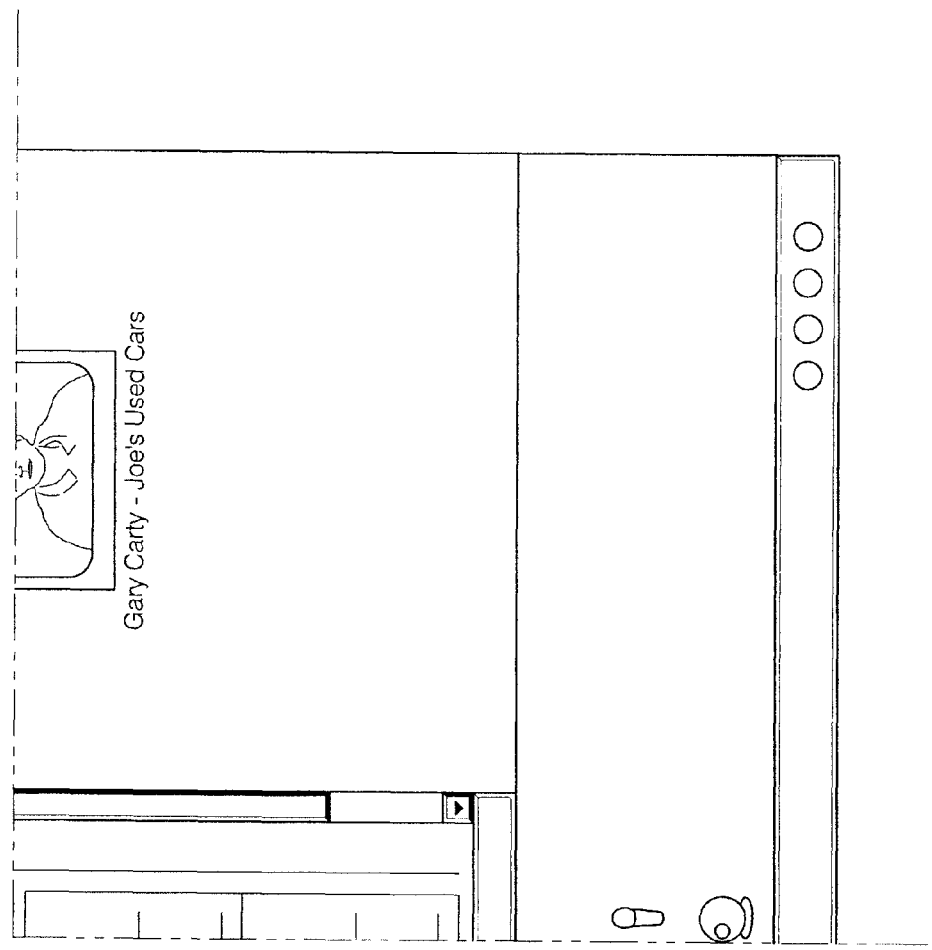

FIG. 7B₁

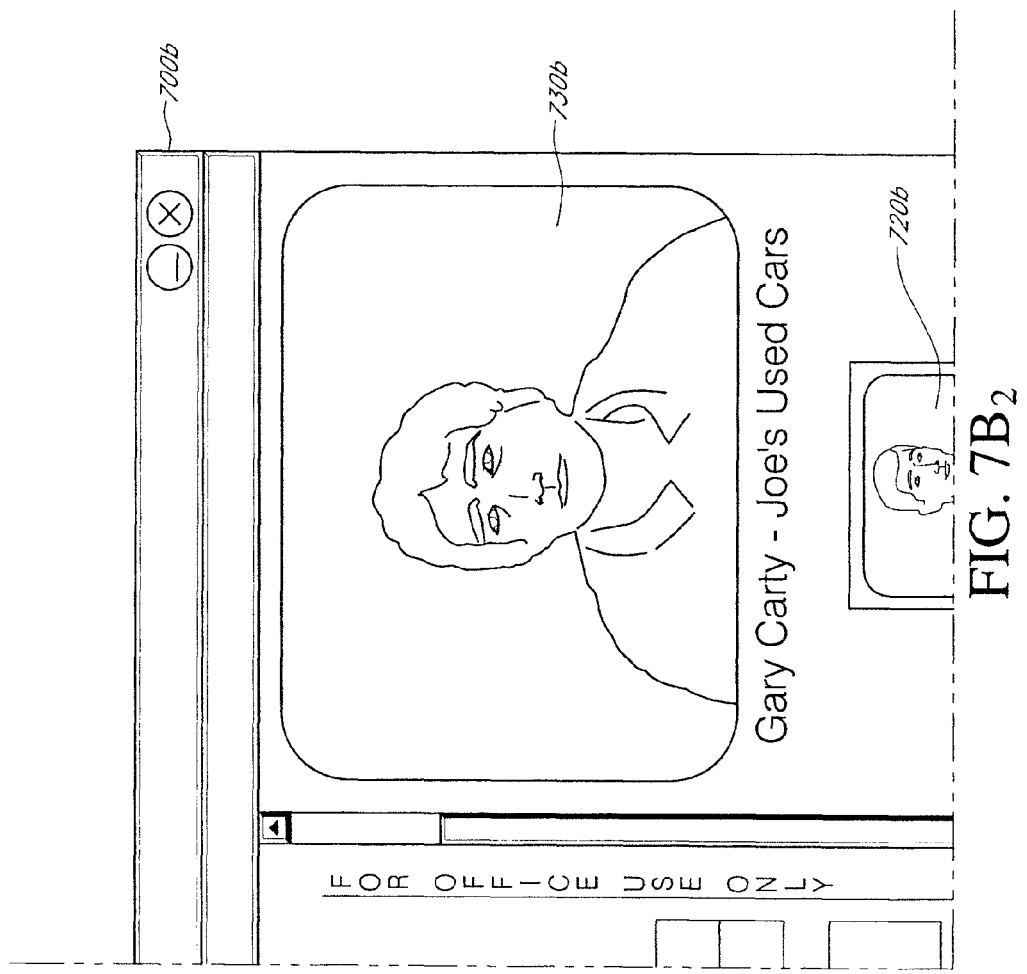

NAME AND PRINCIPLE OFFICE OF THE LIMITED LIABILITY COMPANY (As recorded in the state/county of formation)

LLC Name* __Finance Company LLC_____ Address __11111 Main Street_____

City __Rancho_____ State or County __CA____ Zip or Postal Code __99999__

NAME AND ADDRESS THE LLC PROPOSES TO REGISTER IN WASHINGTON STATE* (If different from above)

LLC Name* _____ Address _____

City _____ State or County _____ Zip or Postal Code _____

FIG. 7B₃

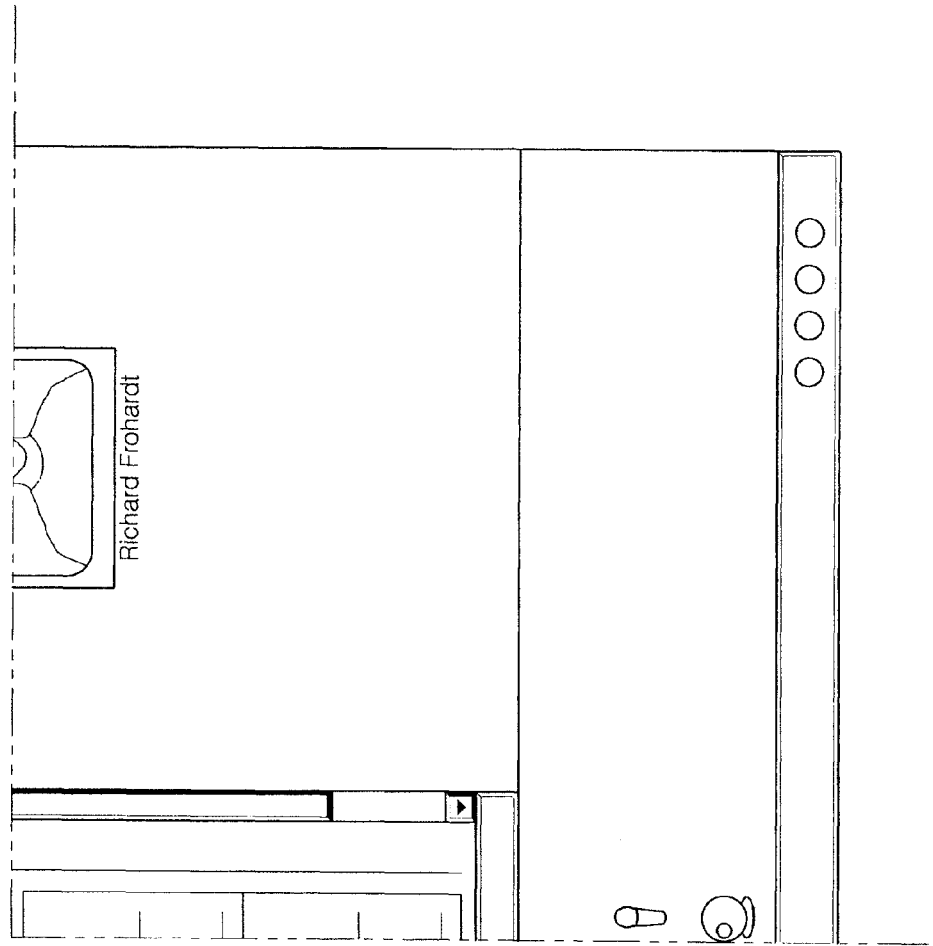
FIG. 7B₄

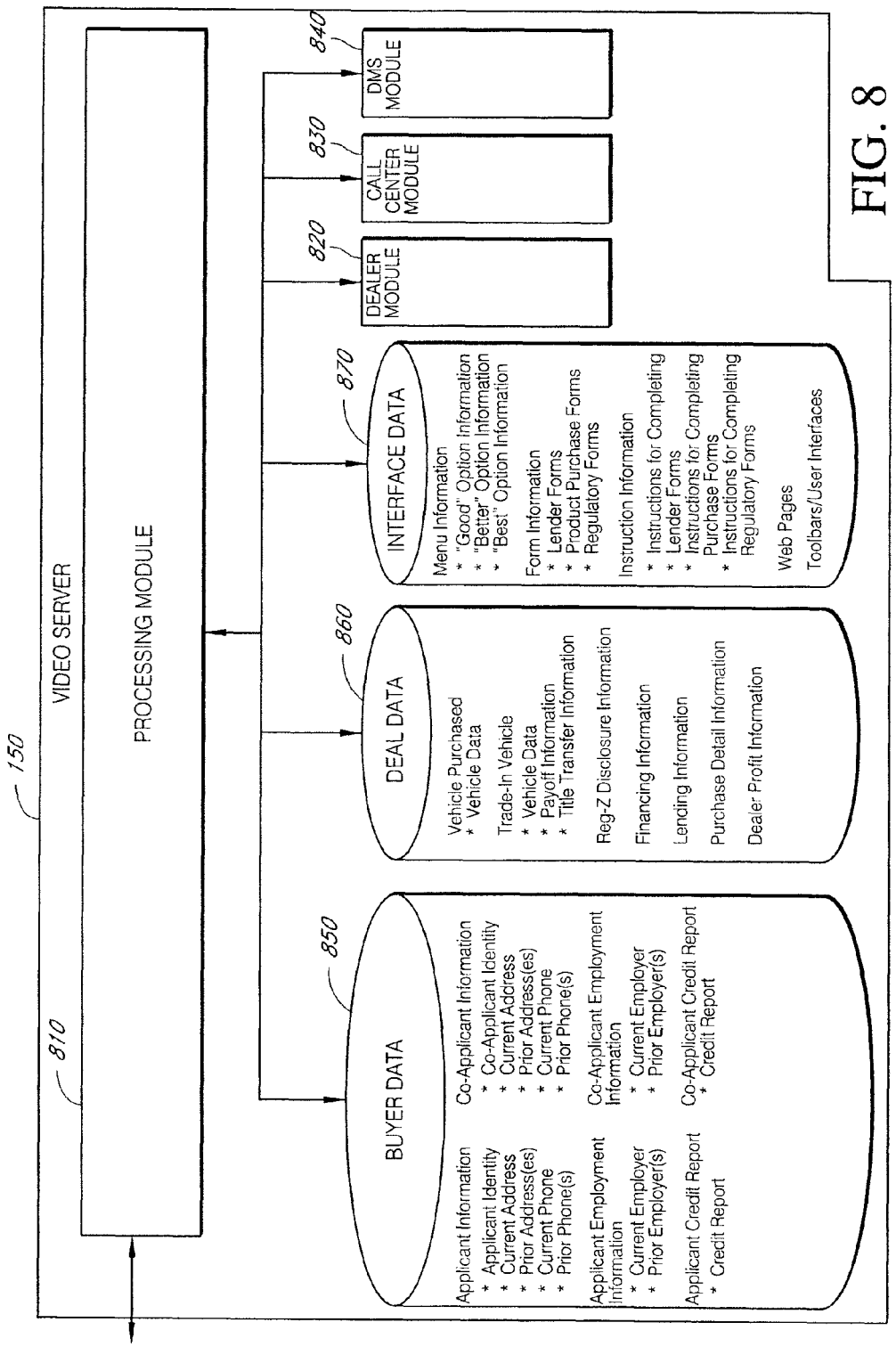

SYSTEMS AND METHODS FOR REMOTE ELECTRONIC TRANSACTION PROCESSING

CROSS-REFERENCE TO RELATED APPLICATIONS

This application claims the benefit under 35 U.S.C. §119 (e) of U.S. Provisional Application No. 60/934,406, filed Jun. 12, 2007, titled SYSTEMS AND METHODS FOR REMOTE ELECTRONIC TRANSACTION PROCESSING, the entire contents of which are hereby incorporated by reference herein and made a part of this specification.

LIMITED COPYRIGHT AUTHORIZATION

A portion of the disclosure of this patent document includes material which is subject to copyright protection. The copyright owner has no objection to the facsimile reproduction by anyone of the patent document or the patent disclosure as it appears in the Patent and Trademark Office patent file or records, but otherwise reserves all copyrights whatsoever.

BACKGROUND

1. Field of the Disclosure

The present disclosure relates to the field of electronic transaction processing generally and in particular to a system for remote electronic transaction processing of sales of automotive products, including finance and insurance products.

2. Description of the Related Art

Large automobile dealers earn profits from not only their automobiles, but also through the sales of other related products such as automobile loans, gap insurance, warranty, and other after market products. Such related products are often very profitable for the dealers. However, these products often require salespersons with special expertise to handle such sales. This is not usually a problem for large dealers. Due to their large sales volumes, large dealers have the budget to keep expert salespersons on staff at their dealerships to sell these related products.

On the other hand, smaller, independent automobile dealers typically do not have high enough sales volumes to be able to hire such expert salespersons. Accordingly, the smaller dealers are left out of the profitable market of related product sales.

SUMMARY

Embodiments of the present disclosure provide systems and methods that provide communication between a dealer system and a call center system. In one embodiment, the systems and methods allow an expert salesperson to sell products to a dealer's customers while communicating from a remote call center. The dealer can finalize automotive transactions and offer after market products in a manner which is not only in compliance with industry requirements, but also affords the dealership owner the opportunity to offer these services without incurring the necessary expense of full time expert salespersons on staff.

In one embodiment, a computer-based system to assist the closing of a proposed sales transaction of automotive products using a trained operator situated at a location remote from a vendor is provided. The computer-based system may include a camera that captures an image of the operator; a screen that displays an image of a customer sent from a vendor computer system; an interface module configured to permit entry of information pertaining to the proposed transaction by the trained operator and to display information pertaining to the transaction to the operator; a processing module configured to determine one or more terms of the transaction; and a communications module configured to receive an indicator relating to the proposed transaction from the vendor computer system, retrieve information pertaining to the proposed transaction from a dealer management system using the indicator, transmit the image of the operator to the vendor computer system, permit audio communication with the operator and the vendor computer system, transmit at least some information pertaining to the proposed transaction to a third party, receive an indication from the third party that the proposed transaction has been accepted; and transmit an instruction for the vendor computer system to print a copy of documents required to complete the transaction.

In a further embodiment, a video server system configured to facilitate communication between a automotive dealer system and a call center system, the video server system is provided. The video server system may include a buyer database configured to store data about a plurality of customers; a deal database configured to store information about automotive transactions involving the plurality of customers; an interface database configured to store web pages used to present and obtain information from automotive dealer systems and call center systems related to the sale of automotive finance and insurance products; a dealer module configured to communicate with the processing module to facilitate communication with an automotive dealer system; a call center module configured to communicate with the processing module to facilitate communication with a call center system; a dealer management system module configured to communicate with the processing module to facilitate communication with a dealer management system; and a processing module configured to communicate with the dealer module, the call center module, the dealer management system module, the buyer database, the deal database, and the interface database, and further configured to enable real-time video data transfer between the dealer system and the call center system.

In another embodiment, a method of closing a proposed automotive transaction with the assistance of a trained operator at a remote location is provided. The method may include forming an agreement to sell an automotive aftermarket product to a customer; requesting assistance from the operator to close the proposed transaction; providing an indicator of at least some terms of the proposed transaction to the operator such that the operator can obtain information on the proposed transaction from a dealer management system using the indicator; providing a computer system configured to allow audio and video communication between the customer and the operator and configured to accept data and instructions from a computer operated by the operator; providing a printer to print the documents needed to complete the transaction; and receiving an indication sent from the operator to automatically print the documents.

In a further embodiment, a method of assisting a vendor at a remote location to close a proposed transaction is provided. The method may include receiving a request for assistance with a closing process from the vendor; receiving one or more terms of the proposed transaction from the vendor; providing a computer system configured to allow audio and video communication between a trained operator of the computer system and a customer at the remote location, wherein the computer system is configured to send data and instructions to a computer at the remote location; instructing the computer at the remote location to print a copy of required documents; and communicating with the customer to provide instructions for executing the required documents.

For purposes of summarizing the invention, certain aspects, advantages and novel features have been described herein. Of course, it is to be understood that not necessarily all such aspects, advantages or features will be embodied in any particular embodiment. Moreover, it is to be understood that not necessarily all such advantages or benefits may be achieved in accordance with any particular embodiment of the invention. Thus, for example, those skilled in the art will recognize that the invention may be embodied or carried out in a manner that achieves one advantage or group of advantages as taught herein without necessarily achieving other advantages or benefits as may be taught or suggested herein.

BRIEF DESCRIPTION OF THE DRAWINGS

FIG. 5A illustrates a screen display of one embodiment of an interface viewed by a dealer system.

FIG. 5B illustrates a screen display of one embodiment of an interface viewed by a call center system.

FIG. 6A illustrates a screen display of one embodiment of an interface viewed by a dealer system.

FIG. 6B illustrates a screen display of one embodiment of an interface viewed by a call center system.

FIG. 7A illustrates a screen display of one embodiment of an interface viewed by a dealer system.

FIG. 7B illustrates a screen display of one embodiment of an interface viewed by a call center system.

FIG. 8 illustrates a high-level block diagram of one embodiment of a video server.

DETAILED DESCRIPTION OF PREFERRED EMBODIMENTS

Figure 1:
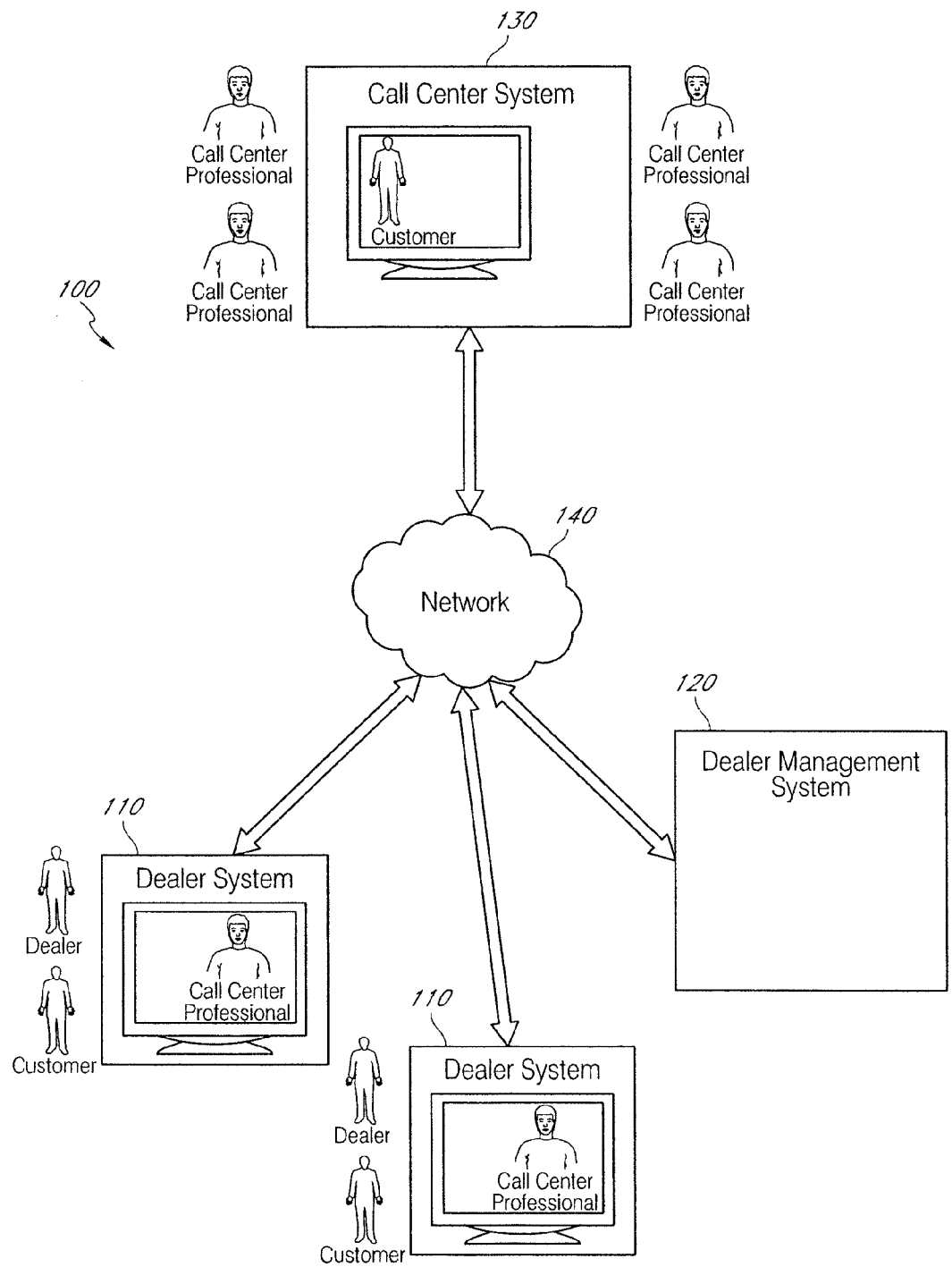
FIG. 1 illustrates a high-level block diagram of one embodiment of a call center system in communication with dealer systems and a dealer management system.

Systems and methods which represent various embodiments and example applications of the present disclosure will now be described with reference to the drawings. For purposes of illustration, some embodiments will be described in the context of used auto sales. However, the present invention is not limited by the type of environment in which the systems and methods are used; the systems and methods may be used in other environments, such as, for example, new auto sales, mortgage transactions, sales of merchandise, other sales, and so forth. The figures and descriptions, however, relate to embodiments in a used auto sales environment. The system may include a variety of users, including but not limited to customers, dealers, operators, and their staff and personnel. It is also recognized that in other embodiments, the systems and methods may be implemented as a single module and/or implemented in conjunction with a variety of other modules and the like. Moreover, the specific implementations described herein are set forth in order to illustrate, and not to limit, the invention.

I. Overview of Some Embodiments

In one embodiment, a customer decides to purchase a vehicle from a dealer. The dealer uses a computer to transmit information relating to the details of the purchase to a call center and allows the customer to use the computer to communicate with a call center operator to obtain financing and other products related to the vehicle. The customer sees the call center operator in a window on the computer screen and can communicate with the call center operator via the computer's monitor, speaker, and microphone. The call center operator presents information to the customer via the dealer's computer, explains the related products, and assists the customer with filling out any documents necessary to complete the purchase of the related products. The call center operator can then print the required documents on a printer connected to the dealer's computer and walk the customer through the signing of the documents. The dealer may then provide the customer with the purchased vehicle along with the final documents for the related products purchased by the customer thereby completing the transaction.

The remote transaction processing system described in the present disclosure generally comprises a video server in communication with a dealer system and a call center system. Customers accessing the dealer system communicate with the call center system allowing operators at the call center system to sell products to the customers thereby providing the customers with experts that can assist the customers with their purchases. In addition, the dealers are able to offer products and services without having to employ the operators and/or have on-site operators available. Instead, the dealers have operators remotely available to assist the dealer's customers. The dealer system and call center system may also communicate with a dealer management system that allows the dealer to store information about its inventory and customer transactions and allows the call center to access that information when working with the dealer.

FIG. 1 illustrates one embodiment of a remote transaction processing system 100 in which a car dealer utilizes a dealer system 110 to access information stored about its car inventory and transactions stored on a dealer management system 120. In addition, the dealer may also use the dealer system 110 to talk to operators connected to a call center system 130 to assist with the closing of a transaction. The operator talks to the customer via the dealer system 110 and walks the customer through a set of available products and helps the customer complete any paperwork related to the customer's transaction. After the customer's transaction is completed, the dealer can finalize the transaction. In FIG. 1, a dealer and customer communicate with the call center system via a network 140. The call center uses information provided by the dealer, customer, and a dealer management system to present products to the customer for purchase.

Figure 2A:
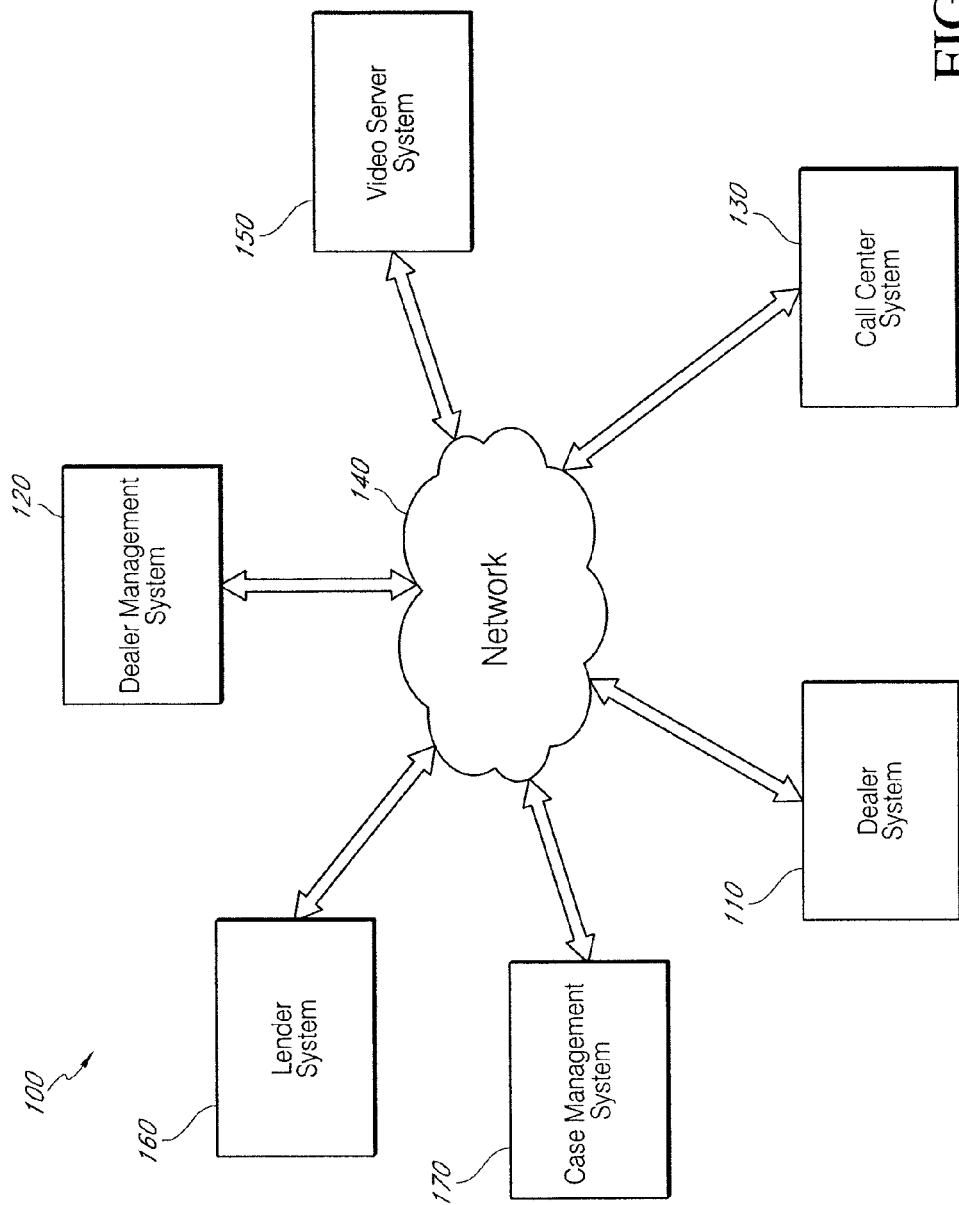
FIG. 2A illustrates a high-level block diagram of one embodiment of a remote transaction processing system comprising a dealer system, a call center system, a video server, a dealer management system, a lender system, a case management system, and a network.

FIG. 2A illustrates one embodiment of a remote transaction processing system 100 in which a network 140 facilitates communication among a dealer system 110, a call center system 130, a video server system (or video server) 150, a dealer management system 120, and a set of third party systems, for example, a lender system 160 and a case management system 170. The dealer management system may be, for example, a dealer management system of Finance Express, LLC. In other embodiments, the remote transaction processing system 100 may include additional dealer systems 110, call center systems 130, video servers 150, dealer management systems 120, and/or third party systems 160, 170. The network 140 may include one or more of a local area network ("LAN"), a wide area network ("WAN"), an intranet, the Internet or the like. In one embodiment, the video server 150 comprises a Web server connected to the World Wide Web. Dealers and call centers connect to the video server 150 through their respective systems comprising any network-enabled and connected device, such as, for example, a personal computer ("PC"). In other embodiments, instead of and/or in addition to a Web-based system, some or all of the system may be implemented using one or more standalone programs executable within an environment such as a computer operating system.

Figure 2B:
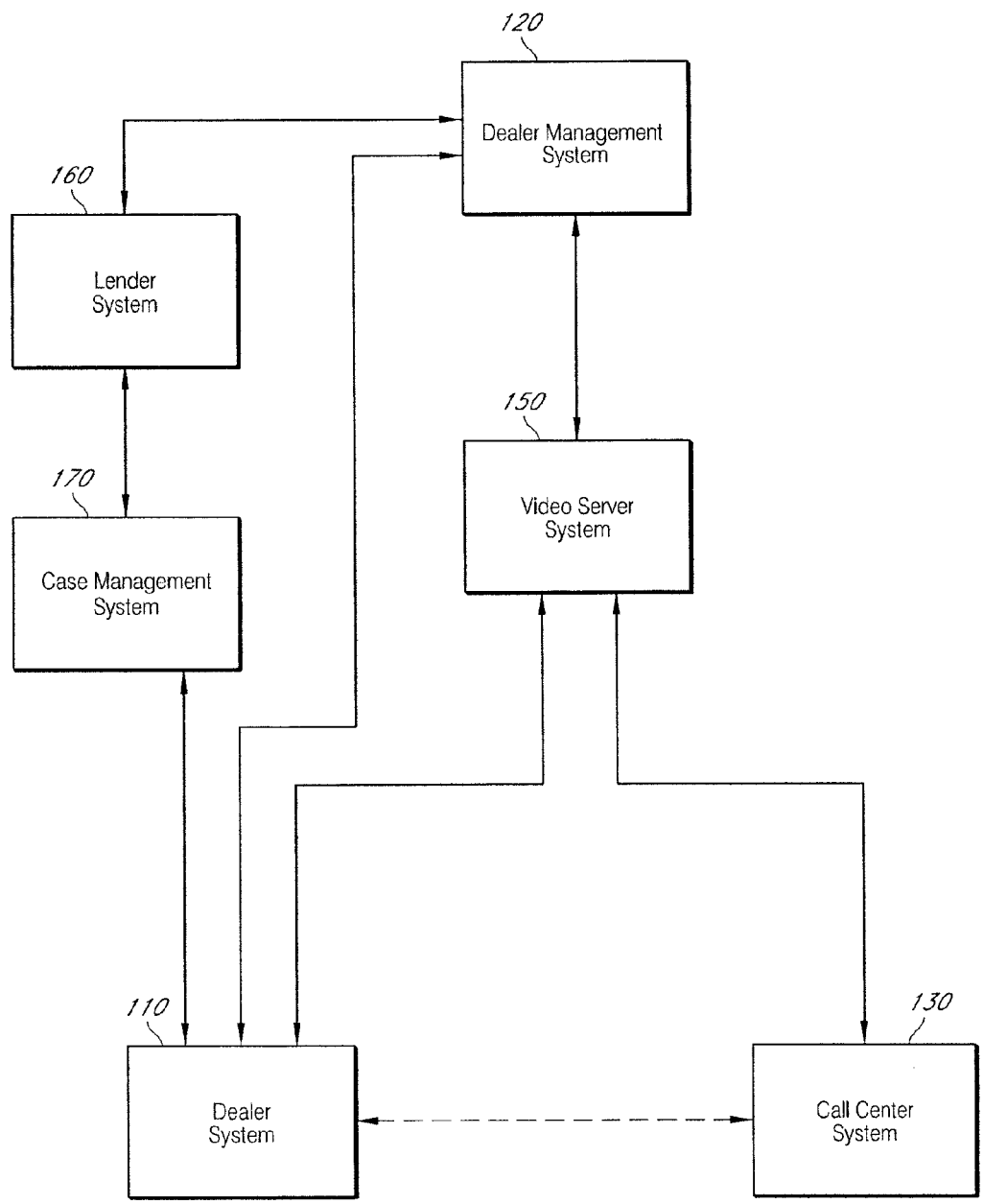
FIG. 2B illustrates a high-level block diagram of one embodiment of the communication among a dealer system, a call center system, a dealer management system, a video server, a lender system, and a case management system.

FIG. 2B illustrates one embodiment of the communication among the systems. The dealer system 110 may communicate with the dealer management system 120 to store transaction information. The dealer system 110 accesses the call center system 130 via a video server 150. The video server 150 accesses information about the transaction from the dealer management system 120 and sends some of the transaction information to the call center system 130 to assist the operator with closing the transaction. The dealer system 110 and the dealer management system 120 may communicate with the lender system 160 and the case management 170 to complete the transaction. It is recognized that FIG. 2B illustrates one embodiment of communication and that in other embodiments, the communication may be different. For example, the lender system 160 may communicate directly with the call center system 130 or via the video server 150.

For purposes of providing an overview of some embodiments, certain aspects, advantages, benefits, and novel features of the invention are described herein. It is to be understood that not necessarily all such advantages or benefits may be achieved in accordance with any particular embodiment of the invention. Thus, for example, those skilled in the art will recognize that the invention may be embodied or carried out in a manner that achieves one advantage or group of advantages as taught herein without necessarily achieving other advantages or benefits as may be taught or suggested herein.

II. Sample Operation

For purposes of illustration, a sample scenario will now be discussed in which the systems and methods are used in operation. In this sample scenario, a used auto dealer uses the system 100 to remotely process a loan application and offer finance, insurance, and other aftermarket products ("F & I products") to a customer with the assistance of a call center staffed by people trained in best practices for selling F & I products ("F & I managers," "call center operators," "call center professionals").

An example that considers the use of one embodiment of the system 100 with a hypothetical purchaser, Paula, and dealer, Dan, may be illustrative. Paula comes to Dan's dealership one day and decides to purchase a 2001 BMW, having heard that the German car was well built and maintains its value longer than most cars. Dan is eager to sell the car, but Paula does not have sufficient cash on hand to buy the car outright. She could leave the lot and obtain financing from a bank before returning to buy the car, but that would be time consuming and quite a hassle. Dan could also make inquiries with various lenders with whom he has dealt, but this may also take time and require duplication of effort if he needs to check with more than one lending source.

If Dan or a person on his staff has the requisite training and/or expertise, Dan may streamline the entire purchase by using his computer to access a dealer management system 120. The dealer management system 120 tracks Dan's customers and his inventory of cars and maintains his connections with a number of lenders. To complete this transaction, Dan sits down at his web-enabled computer, opens an Internet browser program, such as for example, Internet Explorer, and logs on to the dealer management system 120, hosted on a web-server accessible via a network such as the World Wide Web. Here, Dan can enter information about Paula, such as her name, social security number, and address. Using this information, the dealer management system 120 may retrieve a credit history report and credit score. Dan can then link the BMW from his inventory to Paula's application such that the information about the BMW is linked to Paula's application. Dan can also submit information about the transaction, such as, for example, the price Paula will pay for the BMW, the value of her trade-in vehicle, and/or the amount of her down payment. The dealer management system 120 stores this information and provides Dan with an identification number for the transaction. Dan works with Paula and a few lenders to find and select one or more lenders to use to provide financing for Paula's transaction.

Before Dan can complete the transaction, he wants to provide Paula with options for financing her purchase, as well as other F & I products. In addition, Dan wants to make sure that all of the proper paperwork is completed for the state and federal agencies. However, Dan may not wish to spend the time or money to employ trained persons that are capable of handling the sale of F & I products to his customers. As mentioned above, training employees to gain expertise in government regulations, compliance procedures, loss prevention, and other best practices for selling F & I products may be costly and time-consuming. In addition, it is often difficult to keep up with the changing regulations. If Dan operates a low-volume dealership, it may not make sense for Dan to pay for an employee to be trained in such procedures. In such a case, Dan may want to sell F & I products to his customers without having a trained F & I product salesperson on his staff. In other situations, Dan may have a certified employee for one F & I product but not others and/or he may not have enough certified employees to meet his customers' demands.

As an alternative to hiring on-site employees to sell F & I products, Dan could use a remote transaction processing system 100 to solve his problem. As an example, Dan may make an arrangement with a call center staffed with F & I managers to handle his F & I product sales and closing process. Dan tells the call center which F & I products he would like to offer, including vehicle warranty contracts, extended warranties, GAP insurance contracts (for example, insurance to cover the difference between the book value of a vehicle and the amount owed on a vehicle in the event of total loss of the vehicle), aftermarket vehicle accessories, vehicle service/maintenance contracts, vehicle cleaning services, theft protection agreements and/or vehicle appearance protection products or services. The call center may offer product suggestions to Dan or provide its own options.

To finalize the transaction with Paula, Dan initiates a call center program, which may be a stand alone program or a web-accessible program that is stored on Dan's computer and/or another computer that is part of the dealer system 110. The computer system 110 is connected to a printer, a webcam, and a digital signature pad. Dan then provides his login name, password, as well as identification number for the transaction. Information related to the transaction is presented to Dan, and Dan confirms that the information is the right information for the transaction with Paula. After Dan submits his confirmation, then a call is initiated with the call center system 130 and Dan has Paula sit at the computer 110 in front of the webcam.

An operator from the call center system 130, Frieda, answers the call, allowing Frieda's computer that is part of the call center system 130 and Paula's computer 110 to communicate via a video, audio, and/or data connection. In certain embodiments, Paula and Frieda can see and hear each other in real-time. Paula's computer 110 displays welcome information, live video of Paula, as well as live video of Frieda. At the same time, Frieda's computer 130 displays the transaction information, the welcome information presented to Paula, as well as live video of Paula and Frieda. Frieda can now begin the selling process with Paula. Frieda can talk to Paula about various products, such as possible financing products, such as a loan or a lease, available from one or more lenders. Upon choosing a financing product, Paula and Frieda finalize the terms of the transaction, and the system 100 transmits those details to the lender. Frieda may also offer to Paula aftermarket vehicle-related products according to the call center's agreement with Dan. Paula chooses which products she wishes to purchase with Frieda's help and encouragement.

In addition, Frieda can walk Paula through various forms needed to complete her transaction, such as the purchase agreement, credit forms, title and registration, and any other forms. In addition, Frieda instructs the computer 110 used by Paula to print the final documents required to complete the closing as well as related instructions for completing the documents on a printer at Dan's dealership. Dan and/or Frieda can walk Paula through the process of signing the final documents. After the documents are signed, Frieda sends a final set of closing instructions to Dan's computer. Dan follows the instructions and places the title and registration in escrow while the lender submits the funds to escrow as well. After the title and registration are properly updated and filed with the government agency that deals with motor vehicles ("DMV"), the escrow entity releases the funds to Dan, and Paula is able to drive her BMW away. Dan's inventory shows that the BMW was sold, and he can retrieve information on the transaction.

While the example above involves a used car dealer and specific embodiments of Web pages and screen shots, it is recognized that these embodiments are used only to illustrate features of various embodiments of the systems and methods. Further, the systems and methods may be used in other environments and may be used with other types of and/or combinations of loans, including, for example, car sales, home sales, and rentals. Moreover, the systems and methods can be implemented with any suitable types of and/or combinations of data, including, for example, audio data, graphic files, multimedia data, executable data, and so forth.

III. Example Screen Displays

Figure 3A:
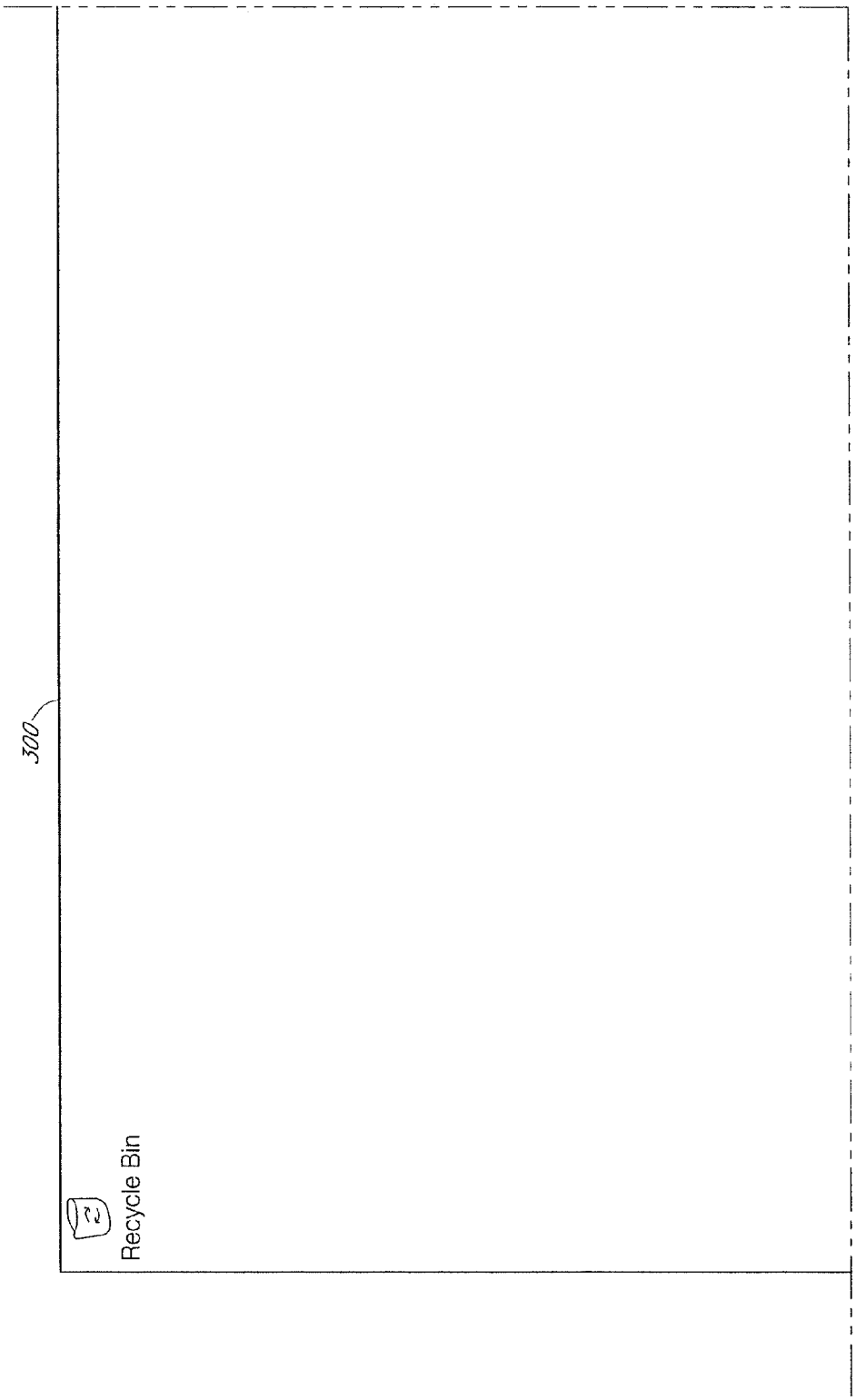
FIG. 3 illustrates a screen display of one embodiment of an interface viewed by a dealer system.
Figure 3B:
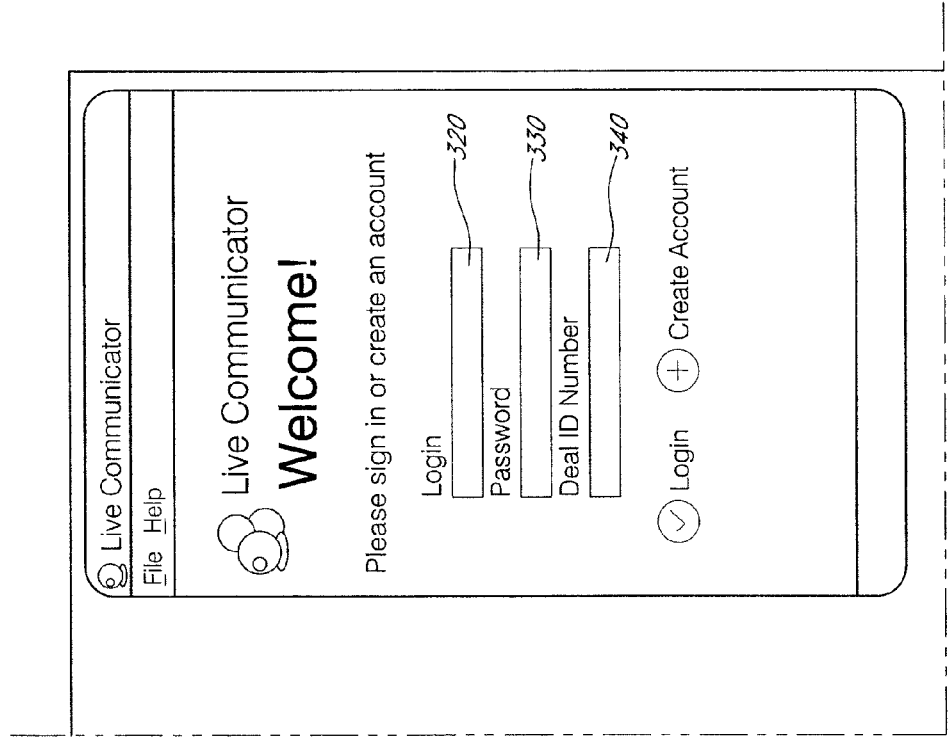
Figure 3C:
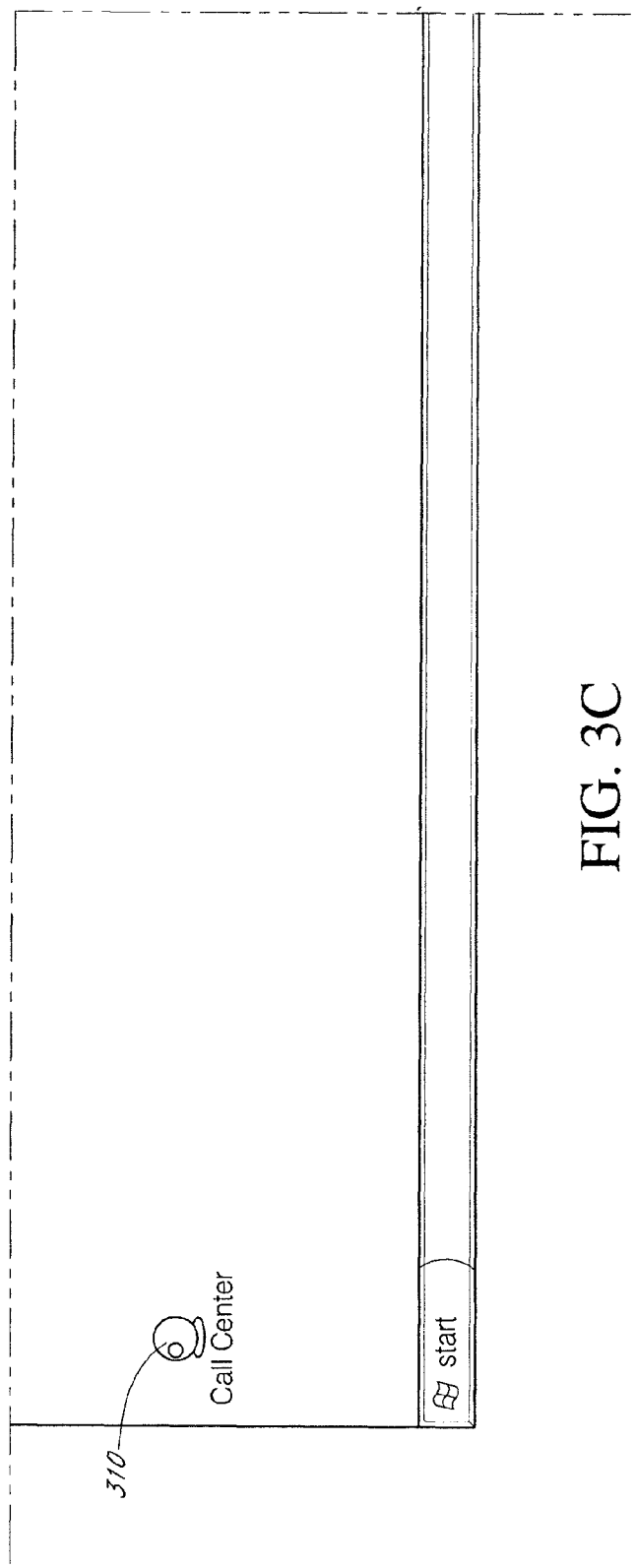
Figures 3, 3D:
Figure 4A:
FIG. 4 illustrates a screen display of one embodiment of an interface viewed by a dealer system.
Figure 4B:
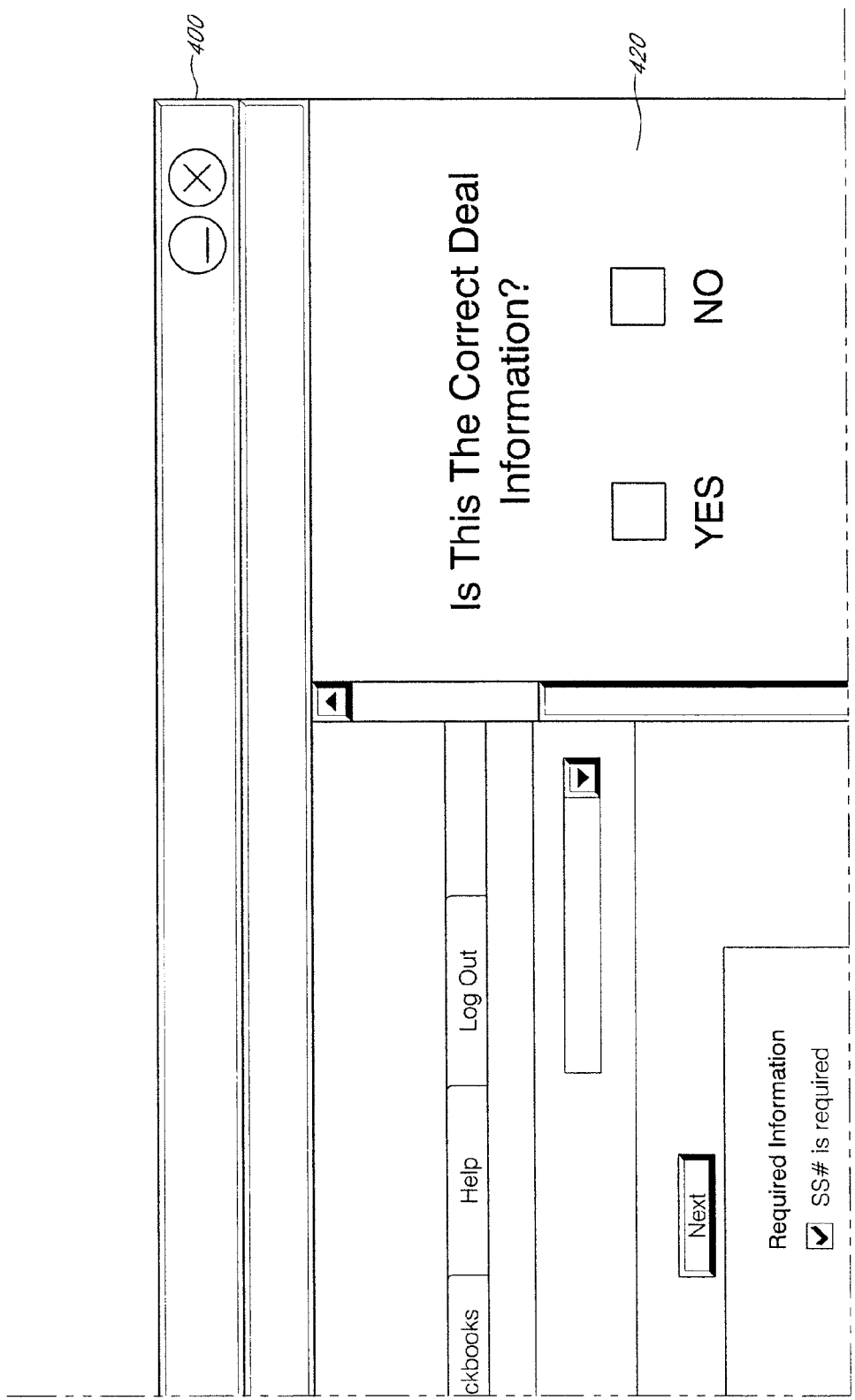
Figure 4D:
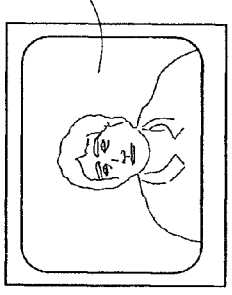
Figure 4E:
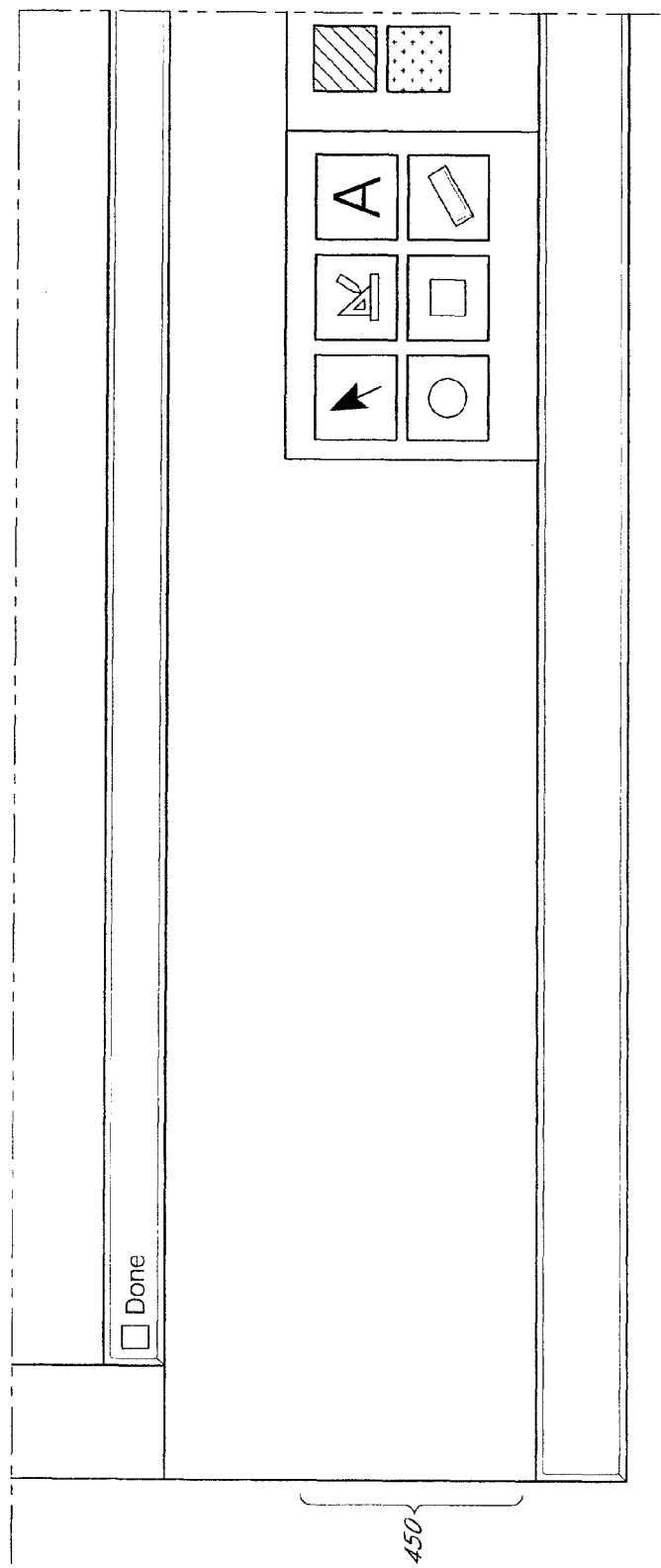

As noted above, in one embodiment, after the customer has selected a vehicle and the dealer and the customer have agreed to the price of the vehicle, the dealer takes the customer to a computer of the dealer system 110 and starts a call center program. FIG. 3 illustrates one embodiment of a screen display 300 shown to the dealer and customer after initiating the call center program 310. The dealer enters his login 320, password 330, and the identifier 340 that corresponds to the transaction with the customer, also referred to as a deal.

FIG. 4 illustrates one embodiment of a screen display 400 shown to the dealer to verify the deal information 410. If the login information is correct, the dealer is presented a confirmation screen 400 with information related to the deal. The dealer can then verify that the proper deal information 410 is being displayed. In the embodiment shown in FIG. 4, the screen includes a window with deal information 410, a verification window 420, a window showing the live video feed of the dealer 430, as well as a set of menus/tabs 440 and toolbars 450 for using the program. It is recognized that the term window may refer to a visual area, usually rectangular in shape, which includes a user interface that displays the output of and allows input for one of a number of simultaneously running computer processes. The term window may also mean merely an area of the screen display. It may be a stand alone interface component and/or may be integrated into other user interface components. After the dealer submits a response that the deal information is correct, then a call is initiated with the call center system 130 via the video server 150. The dealer then asks the customer to begin using the computer 110.

Figure 5A:
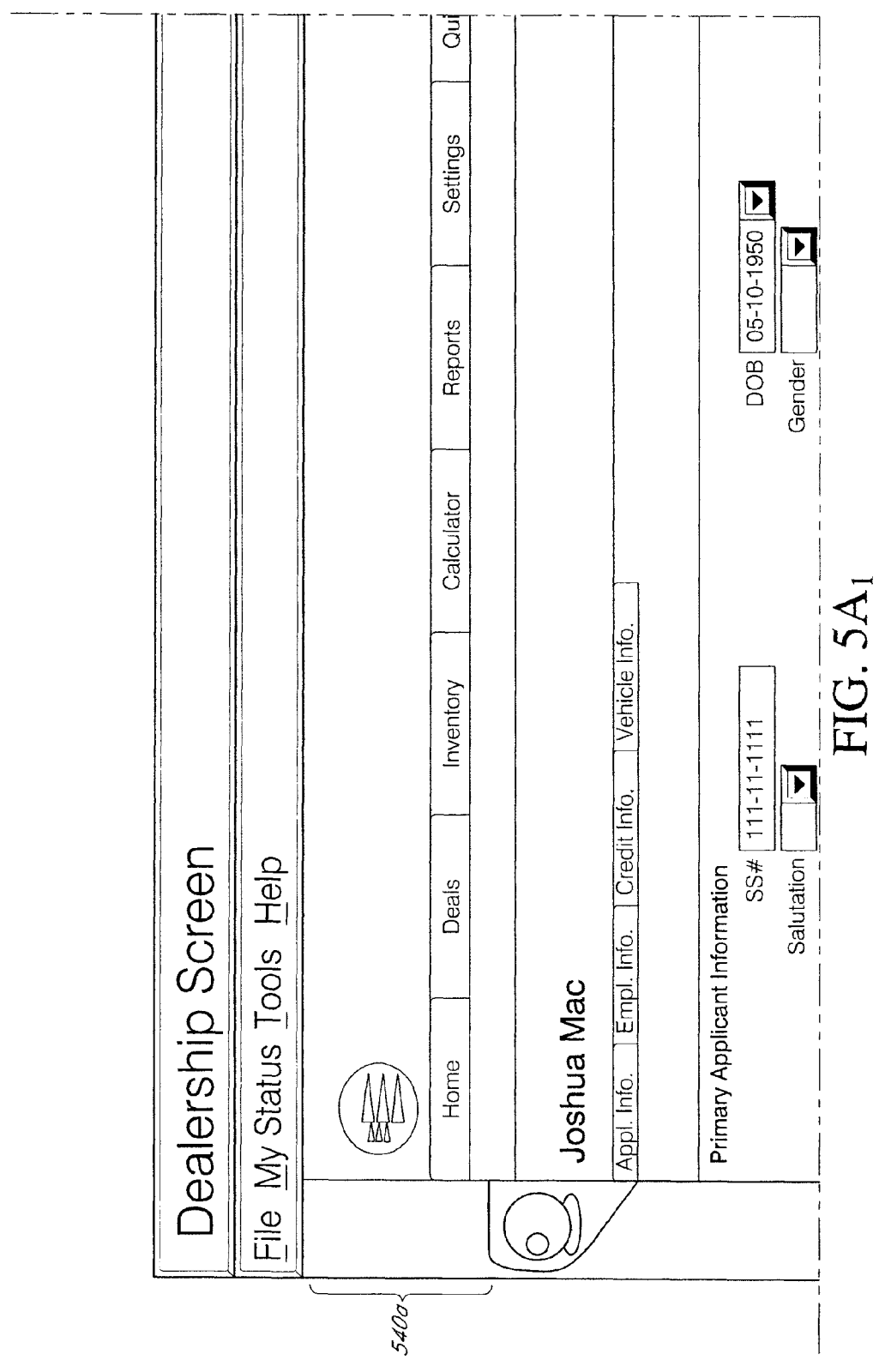

FIG. 5A illustrates one embodiment of a screen display shown to the customer after the call center operator answers the call. The video server 150 receives the call from the dealer, and it routes the call to an available call center operator using the call center system 130. After the call center operator answers the call from the dealer, the customer, using the computer of the dealer system 110, is presented with a screen 500a that includes a window of welcome information 510a, a window showing the live video feed of the call center operator 520a, a window showing the live feed of the customer 530a, as well as menus/tabs 540a and toolbars 550a for using the program.

FIG. 5B illustrates one embodiment of a screen display shown to the call center operator after answering the call. After the call center operator answers the call from the dealer, the call center operator is presented with a screen 500b that includes a window of an initial set of deal information 560b, a window showing the live video feed of the customer 530b, a window showing the live feed of the call center operator 520b, a window of information viewed by the customer 510b, as well as menus/tabs 540b and toolbars 550b for using the program.

FIG. 6A illustrates one embodiment of a screen display shown to the customer when selecting products for purchase. FIG. 6B illustrates one embodiment of a screen display shown to the call center operator when selling products to the customer. The call center operator sells the customer various F & I products. In one embodiment, the call center operator's screen 600b includes information that is different from the customer's screen 600a. The customer's screen 600a includes a window that displays menu selections that illustrate options available for purchase by the customer 610a, a window showing the live video feed of the call center operator 620a, a window showing the live feed of the call customer 630a, as well as menus/tabs 640a and toolbars 650a for using the program. The call center operator's screen 600b may include a window showing the live video feed of the customer 630b, a window showing the live feed of the call center operator 620b, menus/tabs 640b, and toolbars 650b for using the program, and a window that shows the information presented on the customer's screen 610b. As one example, for selling financing products, the call center operator's screen 600b may include a worksheet 660b used to calculate the financing terms.

FIG. 7A illustrates one embodiment of a screen display shown to the customer when selecting products for purchase. FIG. 7B illustrates one embodiment of a screen display shown to the call center operator when selling products to the customer. To complete the deal, the call center operator walks the customer through the signing of various forms needed for the deal. Accordingly, the call center operator and the customer may view similar or the same information. As another example, the customer's screen 700a includes a window that displays a product purchase agreement, disclosure, or registration form 710a, a window showing the live video feed of the call center operator 720a, a window showing the live feed of the call customer 730a, as well as menus/tabs 740a and toolbars 750a for using the program. To assist with completing a product purchase agreement, disclosure, or registration form, the call center operator's screen 700b may include the product purchase agreement, disclosure, or registration form 710b, a window showing the live video feed of the customer 730b, a window showing the live feed of the call center operator 720b, and menus/tabs 740b and toolbars 750b for using the program.

While various screen shots have been used to show various embodiments of screen displays, it is recognized that a wide variety of screen displays may be used. In addition, the information may be presented in a variety of formats and/or may be show in a web-based program or a stand alone program.

IV. Remote Transaction Processing System

As mentioned above, FIG. 2A illustrates one embodiment of a remote transaction processing system 100 in which a video server 150 facilitates communication among a dealer system 110, a call center system 130, and a dealer management system 120 over a network 140. In addition, the remote transaction processing system 100 may also include a lender system 160, and/or a case management system 170 in communication with the dealer system 110, the call center system 130, and/or the dealer management system 120.

A. Video Server

FIG. 8 illustrates one embodiment of video server 150, comprising a processing module 810, a dealer module 820, a call center module 830, and a dealer management system module ("DMS module") 840 that provides program code for displaying interfaces to and communicating with the dealer system 110, the call center system 130, and the dealer management system 120. In addition, the video server 150 includes a buyer database 850, a deal database 860, and an interface database 870 storing buyer data, deal data, and interface data used for selling the F & I products offered by the call center system 130, respectively.

1. Processing Module

Processing module 810 communicates with the dealer system 110, the call center system 130, and the dealer management system 120 over a network 140. In one embodiment, this communication is done through secure web-based communications, such as HTTPS, the use of an encrypted secure socket layer with the hyper-text transfer protocol. In one embodiment, processing module 810 acts as a Web server, accepting data requests from browsers located on dealer system 110, the call center system 130, and/or the dealer management system 120, and responding with appropriate Web pages. The processing module communicates with the network 140 through a network interface module (not shown) as discussed below. The processing module 810 also communicates with the buyer database 850, the deal database 860, and the interface database 870 to store buyer data, deal data, and interface data.

2. Dealer Module

In the embodiment shown in FIG. 8, the video server 150 comprises a dealer module 820 that includes program code for managing communication with the dealer system 110. The dealer module 820 may allow the dealer system 110 to access (for example, log onto) the video server 150. In addition, in one embodiment, the dealer module 820 stores and retrieves secure dealer identification information, including passwords, alphanumeric identifiers, and the like, in one or more databases as described herein.

The dealer module 820 may also provide an interface for the dealer to select F & I products to offer to customers. For example, the interface may allow a dealer to select from one or more of a vehicle warranty contract, a GAP insurance contract, an aftermarket vehicle accessory, a vehicle maintenance contract, a vehicle cleaning contract, a theft protection contract, a vehicle appearance protection product, or any combination of the foregoing products or services and/or may allow the dealer to choose specific vendors that offer those products. The interface may comprise code for providing recommendations of F & I products to dealers and dynamically changing the F & I products to be offered depending on factors, such as, for example the type of vehicle being sold, the customer's data, the dealership's data, and so forth.

In one embodiment, the dealer module 820 displays an interface for the dealer to supply customer information and terms of contemplated transactions to a call center operator. The dealer module 820 may pass such information to the call center module 830 for further handling.

The dealer module 820 may also provide an interface for a customer to communicate with a call center operator and an interface to view and complete forms or other transaction documents. For example, the dealer module 820 may send instructions to the dealer system 110 to display an interface that includes a plurality of panes, sections, screens, or windows. One portion of the interface may contain a live video image of a call center operator obtained from the call center system 130. One or more other portions of the interface may display information in a graphical, tabular, and/or textual format to the customer.

3. Call Center Module

In one embodiment, video server comprises a call center module 830, which includes program code for managing communications with the call center systems 130. The call center module 830 comprises program code for supplying dealer management system data and/or interface data to the call center system 130. The call center module 830 provides instructions for connecting to one or more call center systems staffed with F & I managers and/or call center operators. The call center module 830 allows one or more operators (for example, an F & I manager or call center operator) at a call center to use a call center system 830 to access the dealer system 110 via the video server 150. In addition, the call center module 830 provides an interface for the call center operator to view information pertaining to the dealer and customer being served, the F & I products being offered, and information about the transaction being processed.

In one embodiment, the interface may comprise a live video image of a customer received from a dealer system 110 and shown in a screen on the call center system 130.

In one embodiment, the interface shows the available F & I product opportunities based upon the buyer's information, including, for example, credit data, cars in the dealer's inventory, and available programs and products as illustrated in the embodiments shown in FIGS. 3-7. This interface allows the operator to determine the best deal and to customize the deal structure to try and obtain that solution from the lender or other vendor.

4. Dealer Management System Module

In one embodiment, video server 150 comprises a dealer management system module 840, which includes program code for managing communications with the dealer management systems 120. In one embodiment, the video server 156 receives an identifier from the dealer system 110 that corresponds to a deal data stored in the dealer management system 120. The dealer management system module 840 communicates with the dealer management system 120 to obtain and/or update information on the corresponding deal using the identifier.

5. Databases

In one embodiment, the video server 150 includes a buyer database 850, a deal database 860, and an interface database 870. These databases may be included in a single physical database or numerous databases in various embodiments as discussed further below. The databases may be integrated with the video server 150 or one or more of the databases may be connected directly or indirectly to the video server 150. In one embodiment, one or more of the databases may be connected to a backend component (not shown) that receives database requests via servlets, small programs that run on servers, and sends a corresponding request to the network interface module. It is recognized that in other embodiments data access may be performed differently, for example, a different type of backend component may be used.

The buyer database 850 stores buyer data and may include in one embodiment, for example, the following information:

Applicant Information
    Applicant Identity
    Current Address
    Prior Address(es)
    Current Phone
    Prior Phone(s)
Applicant Employment Information
    Current Employer
    Prior Employer(s)
Applicant Credit Report
    Credit Report
Co-Applicant Information
    Co-Applicant Identity
    Current Address
    Prior Address(es)
    Current Phone
    Prior Phone(s)
Co-Applicant Employment Information
    Current Employer
    Prior Employer(s)
Co-Applicant Credit Report
    Credit Report The deal database 860 stores deal data and may include in one embodiment, for example, the following information:

Vehicle Purchased
    Vehicle Data
Trade-In Vehicle
    Vehicle Data
    Payoff Information
    Title Transfer Information
Reg-Z Disclosure Information
Financing Information
Lending Information
Purchase Detail Information
Dealer Profit Information The interface database 870 stores interface data used to sell the F & I products offered by the call center system 130, and may include, for example the following information:

Menu Information
"Good" Option Information
"Better" Option Information
"Best" Option Information
Form Information
Lender Forms
Product Purchase Forms
Regulatory Forms
Instruction Information
Instructions for completing lender forms
Instructions for completing purchase forms
Instructions for completing regulatory forms
Web Pages
Toolbars/User Interfaces In other embodiments, the video server 150 may include a dealer database that stores dealer data, such as, for example, dealer name or ID, inventory data for the dealer, inventory data for other dealers, customer data, buyer lists, preferred lenders, commissions for F & I products, and other information associated with a dealer. It is recognized that the video server 150 may include other types of information, such as, for example, inventory data, car pricing data, general credit, loan, and registration or title forms, lender forms, and so forth.

It is recognized that the databases above, including the buyer database 850, the deal database 860, and the interface database 870, may be implemented using one or more relational databases, such as, for example CodeBase, Sybase, Oracle, and Microsoft® SQL Server as well as other types of databases such as, for example, a flat file database, an entity-relationship database, an object-oriented database, and/or a record-based database, or as individual data items stored in addressable memory space, non-volatile random access memory, flash memory, or a mass storage, such as is found in a hard drive. In addition, the databases may include a single database with separate tables or as other data structures that are well known in the art such as linked lists and binary trees. Moreover, the databases may be implemented using the same database type or two or more different database types. Moreover, while the buyer database 850, the deal database 860, and the interface database 870 are shown as three databases, it is recognized that in other embodiments, the database may be stored as a single database, as two databases, or as three or more databases.

6 Network Interface Module

The video server 150 may also include a network interface module (not shown) to facilitate communication among the video server 150 and the dealer system 110, the call center system 130, and/or the dealer management system 120 via the network 140. The network interface module may include, for example, an Ethernet card, modem, cable modem, or the like. In addition, the network interface module may utilize a variety of network protocols. In one embodiment, the network interface module includes the Hypertext Transfer Protocol (HTTP). However, it is to be appreciated that other types of network communication protocols may be used, such as HTTPS, FTP, SMTP, and TCP/IP.

In some embodiment, the video server 150 may reside on the same physical machine as the dealer system 110, the call center system 130, and/or the dealer management system 120. In such a case a network interface module may not be used, since a single processor may perform the actions of the dealer system 110, the call center system 130, the dealer management system 120, and the video server 150 and internal communications may be sufficient in such one embodiment.

7 Input and Output Devices

The video server 150 may communicate with a set of input and output devices. For example, the input device(s) may include a keyboard, roller ball, pen and stylus, mouse, trackball, voice recognition system, or pre-designated switches or buttons. The input device(s) may also include a touch screen associated with an output device. Textual or graphic information may be entered by the user through the input device. The output device(s) may include a speaker, a display screen, a printer, or a voice synthesizer. It is recognized that in some embodiments, one or more of the input and output devices may be included in the video server 150. For example, the video server 150 may include a built-in set of speakers and a built-in touchpad.

8. Video Server System Information

The video server 150 may include a conventional general purpose single-chip or multi-chip microprocessor such as a Pentium® processor, a Pentium® II processor, a Pentium® Pro processor, an x86 processor, an 8051 processor, a MIPS® processor, a PowerPC® processor, or an ALPHA® processor. In addition, the microprocessor may be any conventional special purpose microprocessor such as a digital signal processor or a microcontroller. Furthermore, the video server 150 may be used in connection with various operating systems such as: Microsoft® Windows® 3.X, Microsoft® Windows 95, Microsoft® Windows 98, Microsoft® Windows® NT, Microsoft® XP, Microsoft Vista, Microsoft® Windows® CE, Palm Pilot OS, OS/2, Apple® MacOS®, Disk Operating System (DOS), UNIX, Linux®, VxWorks, or IBM® OS/2®, Sun OS, Solaris OS, IRIX OS operating systems, and so forth.

In one embodiment, the video server 150 is a server, personal computer, a laptop computer, a portable computing device, a computer workstation, a local area network of individual computers, an interactive kiosk, a personal digital assistant, an interactive wireless communications device, a handheld computer, an embedded computing device, or the like.

As can be appreciated by one of ordinary skill in the art, the video server 150 may include various sub-routines, procedures, definitional statements, and macros. Each of the foregoing modules are typically separately compiled and linked into a single executable program. However, it is to be appreciated by one of ordinary skill in the art that the processes that are performed by selected ones of the modules may be arbitrarily redistributed to one of the other modules, combined together in a single module, made available in a shareable dynamic link library, or partitioned in any other logical way. For example, in one embodiment of the invention, the processing module 810 and the network interface module are integrated into a single executable module. Furthermore, for example, in another embodiment, the processing module 810 is maintained in a dynamic link library that is separate from the network interface module. In addition, the processing module 810 and the network interface module may be either an "application program," reside as part of the operating system for the device, or can reside partly in both.

B. Dealer System

Figure 9:
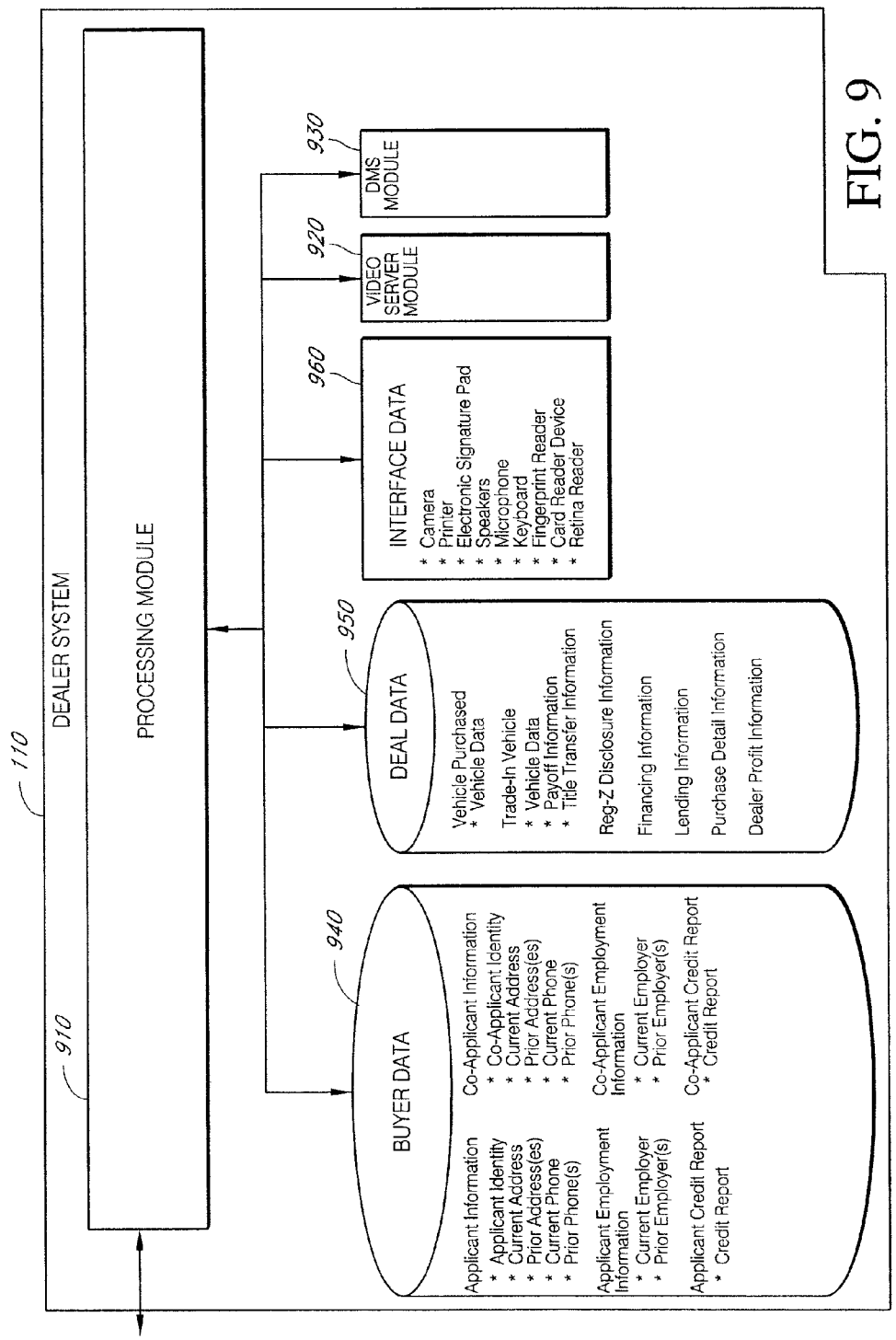
FIG. 9 illustrates a high-level block diagram of one embodiment of a dealer system.

FIG. 9 illustrates one embodiment of the dealer system 110, comprising a processing module 910, a video server module 920, and a dealer management system module ("DMS module") 930. In addition, the dealer server includes a buyer database 940 storing buyer data and a deal database 950 storing deal data. In one embodiment, a dealer and/or customer may utilize the dealer system 110 to electronically send and receive data from the video server 150 using a call center program, via a stand alone program or browser module.

1. Processing Module

Processing module 910 communicates with the video server 150 and the dealer management system 120 over a network 140. In one embodiment, this communication is done through secure web-based communications, such as HTTPS, implemented through the use of an encrypted secure socket layer with the hyper-text transfer protocol. In one embodiment, processing module acts 910 as a Web server, accepting data requests from browsers located on dealer system 110, the call center system 130, and/or the dealer management system 120 and responding with appropriate Web pages. The processing module 910 communicates with the network 140 through a network interface module (not shown) as discussed below. The processing module 910 also communicates with the buyer database 940 and the deal database 950 to receive requested data for display or modification on the dealer systems 110.

2. Video Server Module

In the embodiment shown in FIG. 9, the dealer system 110 comprises a video server module 920 that includes program code for managing communication with the video server 150. The video server module 920 may allow the dealer system 110 to access (for example, log onto) the video server 150. In addition, in one embodiment, the video server module 920 stores and retrieves secure dealer identification information, including passwords, alphanumeric identifiers, and the like, in one or more databases as described herein.

The video server module 920 may receive from the video server 150 an interface for the dealer to select F & I products to offer to customers. For example, the interface may allow a dealer to select from one or more of a vehicle warranty contract, a GAP insurance contract, an aftermarket vehicle accessory, a vehicle maintenance contract, a vehicle cleaning contract, a theft protection contract, a vehicle appearance protection product, or any combination of the foregoing products or services and/or may allow the dealer to choose specific vendors that offer those products. The interface may comprise code for providing recommendations of F & I products to dealers and dynamically changing the F & I products to be offered depending on factors, such as, for example the type of vehicle being sold, the customer's data, the dealership's data, and so forth.

In one embodiment, the video server module 920 receives an interface for the dealer to supply customer information and terms of contemplated transactions to a call center operator.

The video server module 920 may request and receive an interface for a customer to communicate with a call center operator, and an interface to view and complete forms or other transaction documents. For example, the video server module 920 may receive instructions from the video server 150 to display an interface that includes a plurality of panes, sections, screens, or windows. One portion of the interface may contain a live video image of a call center operator obtained from the call center system 130. One or more other portions of the interface may display information in a graphical, tabular, and/or textual format to the customer.

3. Dealer Management System Module

In one embodiment, dealer system 110 comprises a dealer management system module 930, which includes program code for managing communications with the dealer management systems 120 directly or via the video server 150. In one embodiment, the dealer system 110 uses an identifier that corresponds to a deal to store and request data stored in the dealer management system 120. The dealer management system module 930 communicates with the dealer management system 120 to obtain and/or update information on the corresponding deal using the identifier.

4. Databases

In one embodiment, the dealer system 110 includes a buyer database 940 and a deal database 950. These databases may be included in a single physical database or numerous databases in various embodiments as discussed further below. The databases may be integrated with the dealer system 110, or one or more of the databases may be connected directly or indirectly to the dealer system 110. In one embodiment, one or more of the databases may be connected to a backend component (not shown) that receives database requests via servlets, small programs that run on servers, and sends a corresponding request to the network interface module. It is recognized that in other embodiments data access may be performed differently, for example, a different type of backend component may be used The buyer database 940 stores buyer data and may include in one embodiment, for example, the following information:
- Applicant Information
  - Applicant Identity
  - Current Address
  - Prior Address(es)
  - Current Phone
  - Prior Phone(s)
- Applicant Employment Information
  - Current Employer
  - Prior Employer(s)
- Applicant Credit Report
  - Credit Report
- Co-Applicant Information
  - Co-Applicant Identity
  - Current Address
  - Prior Address(es)
  - Current Phone
  - Prior Phone(s)
- Co-Applicant Employment Information
  - Current Employer
  - Prior Employer(s)
- Co-Applicant Credit Report
  - Credit Report The deal database 950 stores deal data and may include in one embodiment, for example, the following information:
- Vehicle Purchased
  - Vehicle Data
  - Trade-In Vehicle
  - Vehicle Data
- Payoff Information
- Title Transfer Information
- Reg-Z Disclosure Information
- Financing Information
- Lending Information
- Purchase Detail Information
- Dealer Profit Information In other embodiments, the dealer system 110 may include a dealer database that stores dealer data, such as, for example, dealer name or ID, inventory data for the dealer, inventory data for other dealers, customer data, buyer lists, preferred lenders, commissions for F & I products, and other information associated with a dealer. It is recognized that the dealer system 110 may include other types of information, such as, for example, inventory data, car pricing data, general credit, loan, and registration or title forms, lender forms, and so forth.

It is recognized that the databases above, including the buyer database 940 and the deal database 950, may be implemented using one or more relational databases, such as, for example CodeBase, Sybase, Oracle, and Microsoft® SQL Server as well as other types of databases such as, for example, a flat file database, an entity-relationship database, and object-oriented database, and/or a record-based database, or as individual data items stored in addressable memory space, non-volatile random access memory, flash memory, or a mass storage, such as is found in a hard drive. In addition, the databases may include a single database with separate tables or as other data structures that are well known in the art such as linked lists, and binary trees. Moreover, the databases may be implemented using the same database type or two more different database types. Moreover, while the buyer database 940 and the deal database 950 are shown as two databases, it is recognized that in other embodiments, the database may be stored as a single database, or more than two databases.

5. Network Interface Module

The dealer system 110 may also include a network interface module (not shown) that communicates with the video server 150 to facilitate communication between the video server 150 and the dealer system 110 via the network 150. The network interface module may include, for example, an Ethernet card, modem, cable modem, or the like. In addition, the network interface module may utilize a variety of network protocols. In one embodiment, the network interface module includes the Hypertext Transfer Protocol (HTTP). However, it is to be appreciated that other types of network communication protocols may be used, such as HTTPS, FTP, SMTP, and TCP/IP.

In some embodiments, the dealer system 110 and the video server 150 may reside on the same physical machine. In such a case a network interface module may not be used, since a single processor may perform the actions of both the dealer system and the video server and internal communications may be sufficient in such one embodiment.

6. Browser Module

In one embodiment, the dealer system 110 includes a browser module (not shown). The browser module presents information to the user, such as, for example, one or more of the interfaces shown in FIGS. 3-7. The browser module and/or a Web page accessible via the browser module may allow the user to request additional data, add data, delete data, and/or modify data. The browser module may be implemented as a module that uses text, graphics, audio, video, and other media to present data and to allow interaction with the data via the network 140. For example, the browser module may include Internet Explorer or Mozilla Firefox. The browser module may be implemented as a combination of an all points addressable display such as a cathode-ray tube (CRT), a liquid crystal display (LCD), a plasma display, or other types and/or combinations of displays. In addition, the browser module may be implemented to communicate with input devices and may also include software with the appropriate interfaces which allow a user to access data through the use of stylized screen elements such as, for example, menus, tabs, windows, dialog boxes, toolbars, and controls (for example, radio buttons, check boxes, sliding scales, etc.). Furthermore, the browser module communicates with a set of input and output devices to receive signals from the user. It is recognized that in other embodiments, the browser module may be implemented as a general interface that does not include access to the network.

In one embodiment, the video server module 920 and/or the dealer management system module 930 communicate with the video server 150 and/or the dealer management system 120 via the browser module.

7. Input and Output Devices

In one embodiment, the dealer system 110 communicates with a set of input and output devices 960. For example, the input device(s) may include a keyboard, roller ball, pen and stylus, mouse, trackball, voice recognition system, or pre-designated switches or buttons. The input device(s) may also include a touch screen associated with an output device. Textual or graphic information may be entered by the user through the input device. The output device(s) may include a speaker, a display screen, a voice synthesizer, and/or a printer, such as a laser printer, an inkjet printer, a line printer, a dot matrix printer, or the like.

In one embodiment, the dealer system 110 includes a camera, such as a webcam, a digital camera, or a digital camcorder, for capturing a still and/or motion image of a user of the dealer system 110 as well as a microphone for capturing sound from the user. The dealer system 110 may also include an electronic signature pad for digitally capturing the handwriting or signature of a user. The dealer system 110 may further include a fingerprint reader, card reader, and/or retina reader for identifying the user.

It is recognized that in some embodiments, one or more of the input and output devices may be included in the dealer system 110. For example, the dealer system 110 may include a built-in set of speakers and a built-in touchpad.

8. Dealer System Information

The dealer system 110 may include a conventional general purpose single-chip or multi-chip microprocessor such as a Pentium® processor, a Pentium® II processor, a Pentium® Pro processor, an xx86 processor, an 8051 processor, a MIPS® processor, a Power PC® processor, or an ALPHAS processor. In addition, the microprocessor may be any conventional special purpose microprocessor such as a digital signal processor. Furthermore, the dealer system 110 may be used in connection with various operating systems such as: Microsoft® Windows® 3.X, Microsoft® Windows 95, Microsoft® Windows 98, Microsoft® Windows® NT, Microsoft® XP, Microsoft® Vista, Microsoft® Windows® CE, Palm Pilot OS, OS/2, Apple® MacOS®, Disk Operating System (DOS), UNIX, Linux®, VxWorks, or IBM® OS/2®, Sun OS, Solaris OS, IRIX OS operating systems, and so forth.

In one embodiment, the dealer system 110 is a personal computer, a laptop computer, a Blackberry® device, a portable computing device, a server, a computer workstation, a local area network of individual computers, an interactive kiosk, a personal digital assistant, an interactive wireless communications device, a handheld computer, an embedded computing device, or the like.

As can be appreciated by one of ordinary skill in the art, the dealer system 110 may include various sub-routines, procedures, definitional statements, and macros. Each of the foregoing modules are typically separately compiled and linked into a single executable program. However, it is to be appreciated by one of ordinary skill in the art that the processes that are performed by selected ones of the modules may be arbitrarily redistributed to one of the other modules, combined together in a single module, made available in a shareable dynamic link library, or partitioned in any other logical way. For example, in one embodiment of the invention, the browser module and the network interface module are integrated into a single executable module. Furthermore, for example, in another embodiment, the browser module is maintained in a dynamic link library that is separate from the network interface module. In addition, the browser module and the network interface module may be either an "application program," reside as part of the operating system for the device, or can reside partly in both.

C. Call Center System

Figure 10:
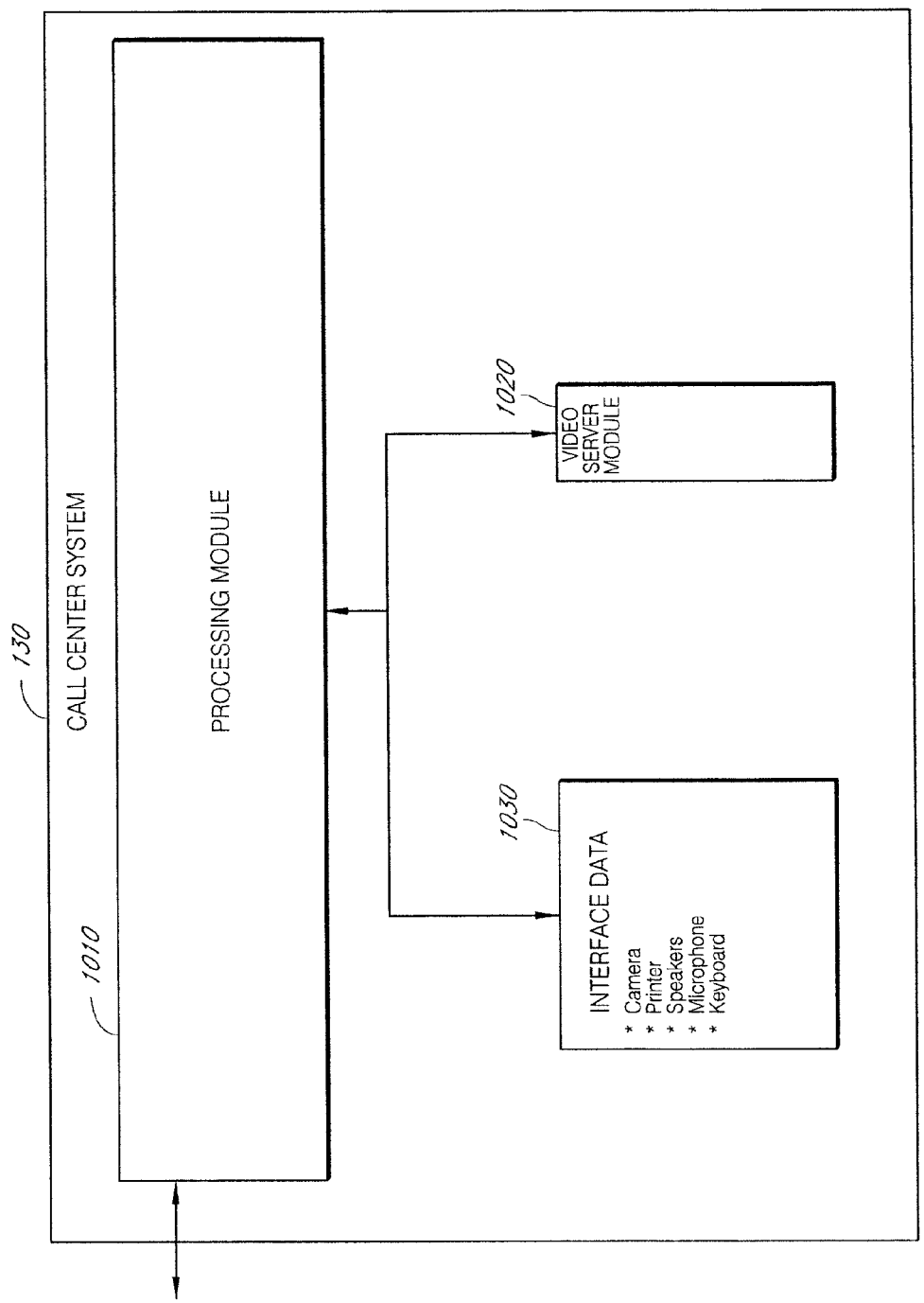
FIG. 10 illustrates a high-level block diagram of one embodiment of a call center system.

FIG. 10 illustrates one embodiment of a call center system 130, comprising a processing module 1010 and a video server module 1020. In one embodiment, the call center system 130 accesses information stored on the video server 150. In one embodiment, a call center operator or F & I Finance Manager utilize the call center system 130 to electronically send and receive data from the video server 150, via a program, such as a stand alone program or browser module.

1. Processing Module

The processing module 1010 communicates with the video server 150 over a network 140. In one embodiment, this communication is done through secure web-based communications, such as HTTPS, the use of an encrypted secure socket layer with the hyper-text transfer protocol. In one embodiment, the processing module 1010 acts as a Web server, accepting data requests from browsers located on the dealer system 110 and responding with appropriate Web pages. The processing module 1010 communicates with the network 140 through a network interface module (not shown) as discussed below.

2. Video Server Module

In the embodiment shown in FIG. 10, the call center system 130 comprises a video server module 1020 that includes program code for managing communication with the video server 150. The video server module 1020 allows the call center system 130 to communicate with the dealer system 110 and/or the dealer management system 120. In addition, the video server module 1020 receives secure dealer identification information, including passwords, alphanumeric identifiers, and the like. In one embodiment, the call center system 130 does not store customer data or deal data in a database on the call center system 130 so as to comply with government regulations. In other embodiments, one or more items of customer data or deal data are stored in one or more databases on the call center system 130.

The video server module 1020 may receive from the video server 150 an interface for the call center operator to select F & I products to offer to customers. For example, the interface may allow a call center operator to select from one or more of a vehicle warranty contract, a GAP insurance contract, an aftermarket vehicle accessory, a vehicle maintenance contract, a vehicle cleaning contract, a theft protection contract, a vehicle appearance protection product, or any combination of the foregoing products or services and/or may allow the dealer to choose specific vendors that offer those products. The interface may comprise code for providing recommendations of F & I products to call center operator and dynamically changing the F & I products to be offered depending on factors, such as, for example the type of vehicle being sold, the customer's data, the dealership's data, and so forth.

In one embodiment, the video server module 1020 receives an interface for the call center operator to receive customer information and terms of contemplated transactions from a dealer.

The video server module 1020 may request and receive an interface for a call center operator to communicate with a customer. For example, the video server module 1020 may receive instructions from the video server 150 to display an interface that includes a plurality of panes, sections, screens, or windows. One portion of the interface may contain a live video image of a dealer or a customer obtained from the dealer system 110. One or more other portions of the interface may display information in a graphical, tabular, and/or textual format to the call center operator.

3. Network Interface Module

The call center system 130 may also include a network interface module (not shown) that communicates with the video server 150 to facilitate communication between the video server 150 and the call center system 130 via the network 140. The network interface module may include, for example, an Ethernet card, modem, cable modem, or the like. In addition, the network interface module may utilize a variety of network protocols. In one embodiment, the network interface module includes the Hypertext Transfer Protocol (HTTP). However, it is to be appreciated that other types of network communication protocols may be used, such as HTTPS, FTP, SMTP, and TCP/IP.

In some embodiment, the call center system 130 and the video server 150 may reside on the same physical machine. In such a case, a network interface module may not be used, since a single processor may perform the actions of both the call center system 130 and the video server 150 and internal communications may be sufficient in such one embodiment.

4. Browser Module

In one embodiment, the call center system 130 includes a browser module (not shown). The browser module presents information to the user, such as, for example, one or more of the interfaces shown in FIGS. 3-7. The browser module and/or a Web page accessible via the browser module may allow the user to request additional data, add data, delete data, and/or modify data. The browser module may be implemented as a module that uses text, graphics, audio, video, and other media to present data and to allow interaction with the data via the network 140. For example, the browser module may include Internet Explorer or Mozilla Firefox. The browser module may be implemented as a combination of an all points addressable display such as a cathode-ray tube (CRT), a liquid crystal display (LCD), a plasma display, or other types and/or combinations of displays. In addition, the browser module may be implemented to communicate with input devices and may also include software with the appropriate interfaces which allow a user to access data through the use of stylized screen elements such as, for example, menus, windows, dialog boxes, toolbars, and controls (for example, radio buttons, check boxes, sliding scales, etc.). Furthermore, the browser module communicates with a set of input and output devices to receive signals from the user. It is recognized that in other embodiments, the browser module may be implemented as a general interface that does not include access to the network.

In one embodiment, the video server module 1020 communicates with the video server 150 via the browser module.

5. Input and Output Devices

In one embodiment, the call center system 130 communicates with a set of input and output devices 1030. For example, the input device(s) may include a keyboard, roller ball, pen and stylus, mouse, trackball, voice recognition system, or pre-designated switches or buttons. The input device(s) may also include a touch screen associated with an output device. Textual or graphic information may be entered by the user through the input device. The output device(s) may include a speaker, a display screen, a printer, or a voice synthesizer.

In one embodiment, the call center system 130 includes a camera for capturing a still and/or motion image of a user of the call center system 130 as well as a microphone for capturing sound from the user. The call center system 130 may also include an electronic signature pad for digitally capturing the handwriting or signature of a user. The call center system 130 may further include a fingerprint reader, card reader, and/or retina reader for identifying the user.

It is recognized that in some embodiments, one or more of the input and output devices 1030 may be included in the call center system 130. For example, the call center system 130 may include a built-in set of speakers and a built-in touchpad.

6. Call Center System Information

The call center system 130 may include a conventional general purpose single-chip or multi-chip microprocessor such as a Pentium® processor, a Pentium® II processor, a Pentium® Pro processor, an xx86 processor, an 8051 processor, a MIPS® processor, a Power PC® processor, or an ALPHA® processor. In addition, the microprocessor may be any conventional special purpose microprocessor such as a digital signal processor. Furthermore, the call center system 130 may be used in connection with various operating systems such as: Microsoft® Windows® 3.X, Microsoft® Windows 95, Microsoft® Windows 98, Microsoft® Windows® NT, Microsoft® XP, Microsoft® Vista, Microsoft® Windows® CE, Palm Pilot OS, OS/2, Apple® MacOS®, Disk Operating System (DOS), UNIX, Linux®, VxWorks, or IBM® OS/2®, Sun OS, Solaris OS, IRIX OS operating systems, and so forth.

In one embodiment, the call center system 130 is a personal computer (PC), a laptop computer, a Blackberry® device, a portable computing device, a server, a computer workstation, a local area network of individual computers, an interactive kiosk, a personal digital assistant, an interactive wireless communications device, a handheld computer, an embedded computing device, or the like.

As can be appreciated by one of ordinary skill in the art, the call center system 130 may include various sub-routines, procedures, definitional statements, and macros. Each of the foregoing modules are typically separately compiled and linked into a single executable program. However, it is to be appreciated by one of ordinary skill in the art that the processes that are performed by selected ones of the modules may be arbitrarily redistributed to one of the other modules, combined together in a single module, made available in a shareable dynamic link library, or partitioned in any other logical way. For example, in one embodiment of the invention, the browser module and the network interface module are integrated into a single executable module. Furthermore, for example, in another embodiment, the browser module is maintained in a dynamic link library that is separate from the network interface module. In addition, the browser module and the network interface module may be either an "application program," reside as part of the operating system for the device, or can reside partly in both.

D. Dealer Management System

In one embodiment, a dealer management system 120 stores and manages information related to a dealer. The information may include, for example, inventory data, deal data, (for example, loan application data, sales transaction data), administration data (for example, user set up data, channel data), services data (for example, fax services data, email services data, print services data), and notes receivable data. One embodiment of a dealer management system is disclosed in U.S. application Ser. No. 11/738,203, entitled "Systems And Methods For Managing Dealer Information," filed on Apr. 20, 2007, and claiming priority to U.S. Provisional Application No. 60/793,596, entitled "Systems And Methods For Managing Car Dealer Information," filed Apr. 20, 2006, both of which are hereby incorporated by reference herein in its entirety and made part of this application. However, it is recognized that a variety of dealer management systems, whether alone or running in conjunction with other systems, may be used herein.

E. Third Party Systems

The remote transaction processing system 100 may also communicate with one or more third party systems. The third party systems may include, for example, one or more lender systems 160 as well as one or more case management systems 170.

1. Lender System

In one embodiment, a lender system 160 processes data to complete a financing deal. The lender system 160 communicates with the dealer system 110, the dealer management system 120, the call center system 130, the case management system 170, and/or the video server 150 to process a financing deal.

2. Case Management System

In one embodiment, a case management system 170 handles the exchange of the final documents. For example, the case management system 170 may include an escrow entity that handles the exchange of the title documents and the monetary payment between the dealer and the lender. In such a case, completed forms that may include electronic or ink signatures of the parties involved may be transferred to the escrow entity. Such an embodiment reduces the need for paper documents and reduces transmission time. In one embodiment, the video server 150 may interact directly with the escrow module or entity and/or the escrow module or entity may be part of the video server 150.

In one embodiment, the case management system 170 may interface with governmental agencies, such as a department of motor vehicles, to register automobiles.

3. Other Systems

It is recognized that a variety of other systems may communicate with the remote transaction processing system 100. The third party systems may include, for example, wholesale value guide systems (for example, Kelley Blue Book, and so forth), floor plan financial detail systems, sale system (for example, e-bay, public auction Web sites, and so forth), payroll systems (for example, EDT, and so forth), insurance systems (for example, State Farm, AAA, and for forth), financial systems (for example, loan rate Web sites, bank sites, and so forth), credit reporting systems, vehicle information systems (for example, VIN decoder systems, CARFAX, and so forth), dealer systems (for example, other used car dealers, and so forth), warranty systems, and government systems (for example, motor vehicle department systems, state tax systems, local tax systems, and so forth). The third party systems may communicate with the remote transaction processing system 100 through a similar or different network 140 as used by the dealer system 110 and/or the call center system 130 or any other system in the remote transaction system 100. In one embodiment, the information is received directly from the third parties and/or via a partner that collects such information. In addition, in one embodiment, the third party information is stored as electronic documents in the video server 150 and all or a portion of one or more of the documents may be made available to the dealers and/or the lenders. This allows, for example, the lender to see the set of document that will be received at the end of the deal, improves the lender's response time by insuring that the necessary documents are complete, thus, in turn, improving the loan process and the likelihood that the loan deal will go through.

F. Network

In one embodiment, the dealer system 110, the dealer management system 120, the call center system 130, and the video server 150 communicate a via a network 140. The network 140 may include one or more of any type of electronically connected group of computers including, for instance, the following networks: a virtual private network, a public Internet, a private Internet, a secure Internet, a private network, a public network, a value-added network, a local area network (LAN), a wide area network (WAN), a wired network, a wireless network, an intranet, an extranet, the Internet, a telephone network, a cable television network, voice over IP (VoIP), data, voice and video over IP (DVVOIP), and/or any other type of network or combination of networks. In one embodiment, the network 140 may be capable of providing video, audio, and/or data communications. In addition, the connectivity to the network 140 may be, for example, remote modem, Ethernet (IEEE 802.3), Token Ring (IEEE 802.5), Fiber Distributed Datalink Interface (FDDI) or Asynchronous Transfer Mode (ATM). The network 140 may connect to the dealer system 110, the dealer management system 120, the call center system 130, and/or the video server 150, for example, by use of a modem or by use of a network interface card that resides in each of the systems.

In addition, the same or different network 140 may be used to facilitate communication among the dealer system 110, the dealer management system 120, the call center system 130, and/or the video server 150.

V. Remote Transaction Processing Methods

In one embodiment, the remote transaction processing system 100 includes a dealer system process 1100, a video server process 1200, and a call center system process 1300.

A. Dealer System Process

Figure 11:
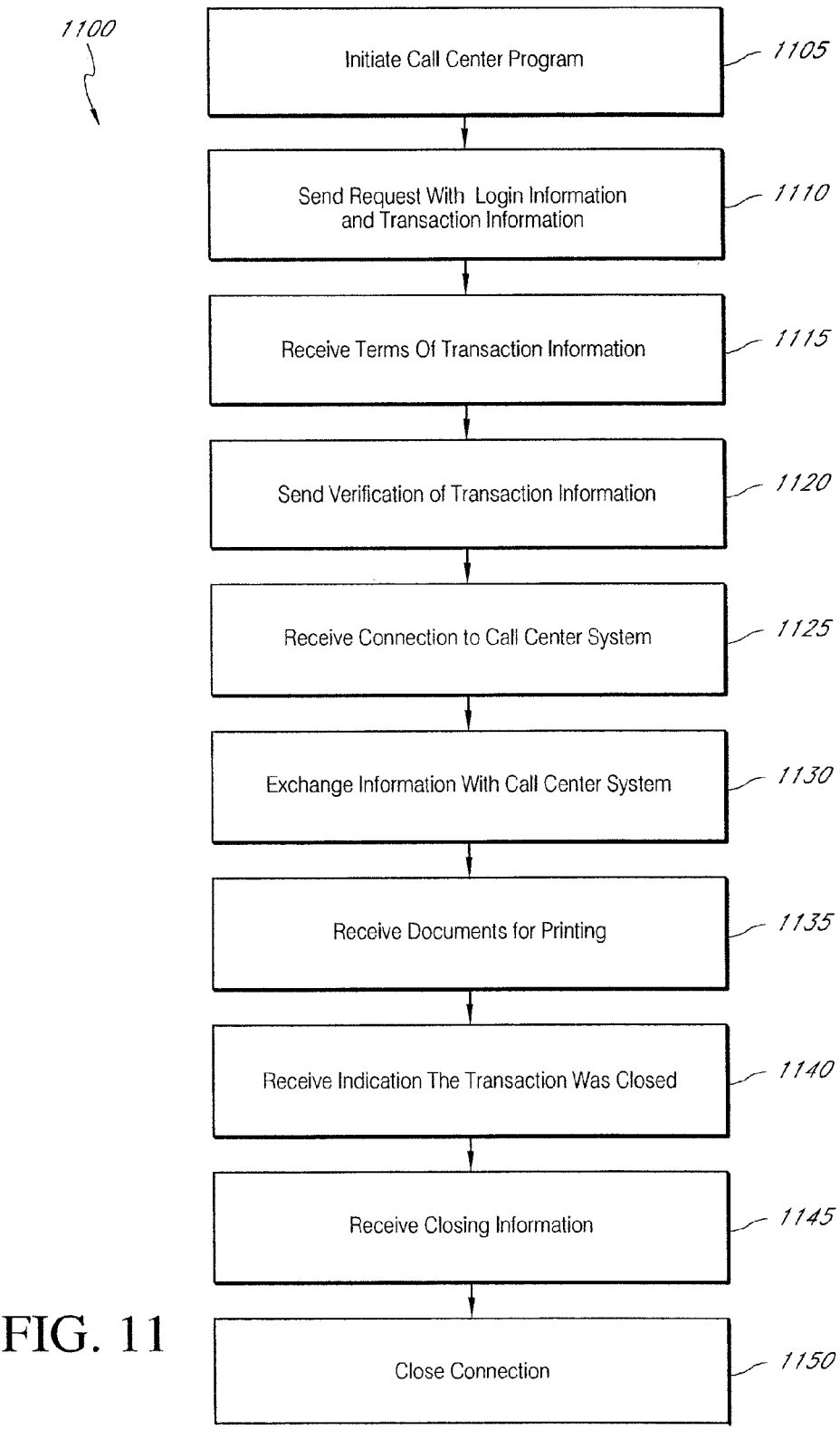
FIG. 11 illustrates a flow chart of one embodiment for processing a transaction by a dealer system.

One embodiment of a dealer system process 1100 is illustrated in FIG. 11. In one embodiment, the dealer system process 1100 runs on a dealer system 110 and is used by a dealer to finalize a transaction between the dealer and a customer after the customer has selected a vehicle, has agreed to a price, and has selected one or more lenders. In one embodiment, the dealer system process 1100 is part of the call center program 310.

In one embodiment, the dealer system process 1100 links the dealer system 110 to the call center system 130 via a video server 150 using a network connection allowing the customer and the call center operator to communicate until the transaction is completed and the final terms of the transaction are established. In one embodiment, the video server 150 supplies the dealer system 110 and the call center system 130 with interface screens or web pages and provides a secure exchange of transaction data among the systems. Further in the embodiment, the data connection may serve as a secured or unsecured communications link for maintaining audio and visual contact between the customer and call center operator. For example, the dealer system 110 may establish a DVVOIP link to call center system 130 over the network 140. Alternatively, audio communications may travel over the network 140 while video communications are handled by the video server 150. In another embodiment, all communications, including data, voice, and video communications, are passed through video server 150.

Beginning at a start state 1105, the dealer system process 1100 initiates the call center program, such as, for example, by starting a stand-alone call center program or by accessing an interne web page via a browser module and receiving a login screen from the video server 150. Proceeding to the next state 1110, the dealer system process 1100 submits a login, password, and a transaction identifier that identifies the transaction between the dealer and the customer and initiates a call with the call center system 130. Proceeding to the next state 1115, the dealer system process 1100 receives information about the transaction from the video server 150. The dealer confirms that the transaction is the correct transaction instructing the dealer system process 1100 and sends an indication that the transaction is correct 1120 to the video server 150. The dealer may then ask the customer to sit in front of the dealer system 110.

In the next state 1125, the dealer system process 1100 receives a connection to the call center system 130 via the video server 150. Next, the dealer system process 1100 receives information regarding various F & I products and exchanges information 1130 with the call center system 130 via the video server 150. This exchange allows the call center operator at the call center system 130 to talk with the customer at the dealer system 110 using real-time video. The call center operator can present various documents and information to the customer for review. In addition, the customer can ask the operator questions. After the customer has selected the F & I products he wants to purchase, the dealer system process 1100 receives an indication from the call center system 120 via the video server 150 to print certain documents and prints the documents 1135. The dealer may then retrieve copies of the required documents from the printer. The call center operator may then walk the customer through the signing of the documents. After the documents are executed, the dealer provides a copy of the executed documents to the customer. The dealer system process 1100 then receives an indication that the transaction is closed 1140. Proceeding to the next state 1145, the dealer system process 1100 receives closing information including, for example, instructions for submitting the form(s) to the proper entities. The dealer may then print the closing information. In one embodiment, the dealer may then notify the appropriate lender and/or other parties to the transaction by communicating with such parties, by entering information into the dealer management system, or by forwarding digitally executed agreements to the parties, for example. Next, the connection closes 1150, such as, for example, based on a command from the video server 150, the dealer system 110, and/or the call center system 130.

It is recognized that FIG. 11 illustrates one embodiment of a dealer system process 1100 and that other embodiments may be used. For example, the video server 150 may retrieve the transaction information from the dealer system 110. In addition, one or more of the states may be performed as a single state, and/or one or more of the states may be executed concurrently.

B. Video Server

Figure 12:
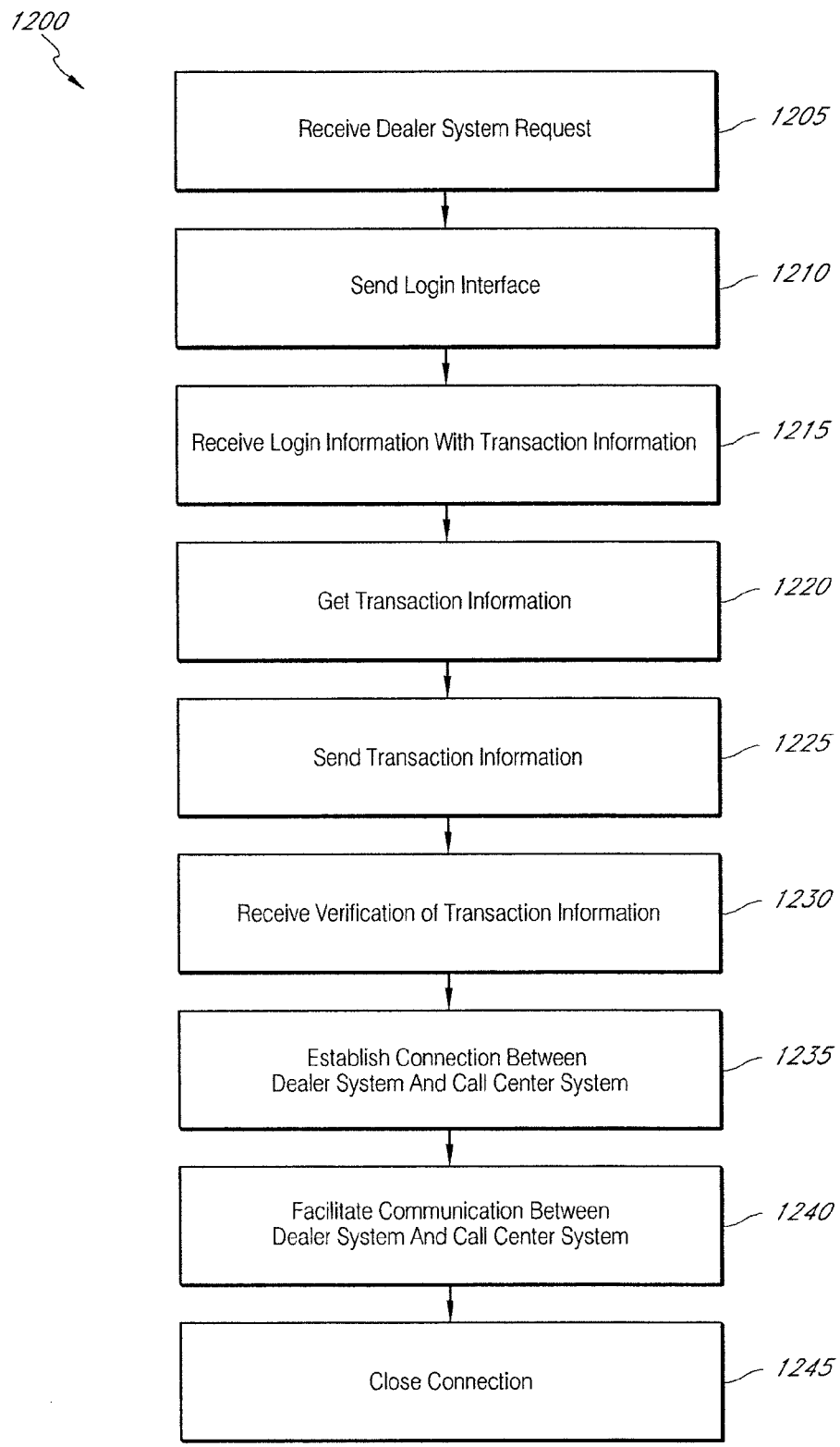
FIG. 12 illustrates a flow chart of one embodiment for processing a transaction by a video server.

One embodiment of a video server process 1200 is illustrated in FIG. 12. In one embodiment, the video server process 1200 runs on the video server 150 and is used to assist a dealer and a call center operator in closing a vehicle sale transaction. In one embodiment, the video server process 1200 is part of the call center program 310.

Beginning at a start state 1205, the video server process 1200 receives a request to begin the call center program. Next, the video server process 1200 sends the dealer system a login screen 1210. Proceeding to the next state 1215, the video server process 1200 receives login information from the dealer system, where the information may include, for example, the dealer's login and password as well as an identifier for the transaction between the dealer and the customer.

Proceeding to the next state 1220, the video server process 1200 retrieves information related to the transaction from a dealer management system using the identifier. In one embodiment, the video server process 1200 retrieves this information from a dealer management system 130. Proceeding to the next state 1225, the video server process 1200 sends transaction information for display on the dealer system. Proceeding to the next state 1230, the video server process 1200 receives an indication from the dealer system that the transaction is correct. Proceeding to the next state 1235, the video server process 1200 establishes a connection between the dealer system 110 and the call center system 130. The connection may serve as a secured or unsecured communications link for maintaining audio and visual contact between the customer and call center operator. For example, the video server 150 may establish a DVVOIP link between the dealer system and the call center system 130 over network connection. Alternatively, audio communications may travel over the network 140 while video communications may be handled by the video server 150. In another embodiment, all communications, including data, voice, and video communications, are passed through the video server 150. In other embodiments, the dealer system 110 communicates directly with the call center system. 130

Next, the video server facilitates communication of data 1240 between the dealer system 110 and the call center system 130. The call center system 130 may receive information related to the dealer and display the information to a call center operator via interfaces supplied by the video server 150.

The information allows the call center operator to plan a closing process and sales pitch customized for the dealership being serviced, the customer being helped, and/or the particulars of the contemplated transaction. The call center operator explains to the customer each of the documents required to complete the transaction and offers additional aftermarket products to the customer, such as vehicle warranty contracts, extended warranties, GAP insurance contracts (for example, insurance to cover the difference between the book value of a vehicle and the amount owed on a vehicle in the event of total loss of the vehicle), aftermarket vehicle accessories, vehicle service/maintenance contracts, vehicle cleaning services, theft protection agreements and/or vehicle appearance protection products or services. In one embodiment, the call center operator may also request a credit report for the customer from a credit bureau or receive credit report data from the dealer. The call center operator may have expertise in the art of persuading customers to purchase said products and may be familiar with government regulations, compliance procedures, loss prevention techniques, and best practices for selling F & I products. The video server process 1200 exchanges information between the dealer system 110 and the call center system 130. After the transaction is closed, the connection closes 1245, such as, for example, based on a command from the video server 150, the dealer system 110, and/or the call center system 130.

It is recognized that FIG. 12 illustrates one embodiment of a video server process 1200 and that other embodiments may be used. For example, the video server may retrieve the transaction information from the dealer system 110. In addition, one or more of the states may be performed as a single state, and/or one or more of the states may be executed concurrently.

C. Call Center Process

Figure 13:
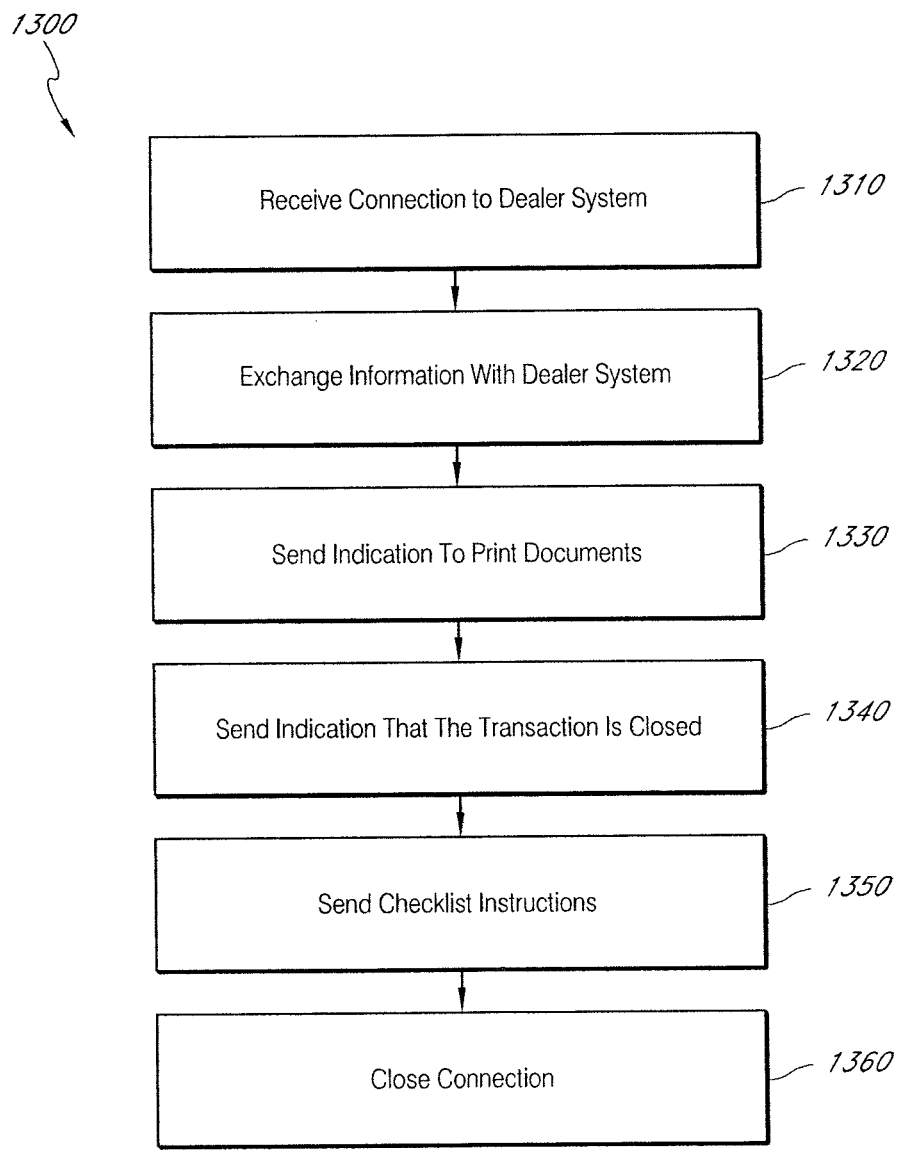
FIG. 13 illustrates a flow chart of one embodiment for processing a transaction by a call center system.

One embodiment of a call center system process 1300 is illustrated in FIG. 13. In one embodiment, the call center system process 1300 runs on the call center system 130 and is used by a call center operator to assist a dealer in completing a sales transaction. In one embodiment, the call center system process 1300 is part of the call center program 310.

Beginning at a start state 1310, the call center system process 1300 receives a connection from the video server 150. Proceeding to the next state 1320, the call center process 1300 exchanges information and data with the dealer system 110 via the video server 150. The information may include finance and/or aftermarket product options as well as calculations for the terms of those options. Proceeding to a next state 1330, the call center process sends a request to print documents related to the transaction to the dealer system 110 via the video server 150. The call center operator may then walk the customer through the terms. Proceeding to the next state 1340, the call center system sends an indication that the transaction is closed. In addition, the call center system process 1300 may send a set of final instructions 1350 to the dealer system 110 via the video server 130. After the transaction is closed, the connection closes 1360, such as, for example, based on a command from the video server 150, the dealer system 110, and/or the call center system 130.

It is recognized that FIG. 13 illustrates one embodiment of a call center system process 1300 and that other embodiments may be used. For example, rather than send an indication to print documents for the customer's signature, the call center system process 1300 may send instructions for the customer to electronically sign the documents using an electronic signature pad connected to the dealer system 110. In addition, one or more of the states may be performed as a single state; and/or one or more of the states may be executed concurrently.

D. Other Processes

It is recognized that the remote transaction processing system 100 may include a variety of other processes. For example, the remote transaction processing system 100 may include a call center set up process that is executed on a call center system 130 and is used by a call center operator to receive information about the F & I products that a dealer would like to offer its customers.

In a first state, the call center system 130 receives, from the dealer, information about F & I products, including aftermarket vehicle products and services and the vendors or suppliers of such products and services, which the dealer wishes to offer his or her customers during a vehicle sale closing. The dealer may communicate its F & I product selections to the call center 130 via the video server 150, for example. The call center system 130 may receive an F & I product selection via an interface provided by video server 150. The call center system 130 may receive F & I product preferences from a dealer by any other suitable means known in the art. In alternative embodiments, the call center may have a standard set of F & I products that it offers to customers of the dealer. In addition, a manager of the call center set up process may also perform any other actions necessary to formalize its relationship with the dealer. The call center set up process may solicit other information from the dealer that is used for the call center to begin handling the dealer's F & I product sales and closing process.

VI. Exemplary Pricing Structures

It is recognized that a variety of pricing structures may be used with the remote transaction processing system 100. For example, the dealers may be charged a flat fee, a subscription fee, and/or individual fees for particular items, such as, for example, the credit reports, the printing of forms, and so forth. As another example, the call centers may be paid a flat fee, a subscription fee, and/or individual fees for particular items, such as, for example, each time they offer a product, and/or each time they sell a product. The dealer and call center may make any suitable arrangement to divide the fees collected. For example, the dealer may pay the call center a fixed fee for handling all of its vehicle closings and/or a commission for each closing handled. In addition, the call center may receive different commissions for the sale of different products and/or services.

VII. Additional Embodiments

Although systems and methods are disclosed with reference to preferred embodiments, the invention is not intended to be limited thereby. Rather, a skilled artisan will recognize from the disclosure herein a wide number of alternatives for the exact ordering the steps. For example, a call center system 130 may maintain direct communication with a dealer system 110 rather than establishing communication via a video server 150. As another example, the video server 150 may obtain information about potential lenders before a call center operator requests such information.

In addition, in other embodiments, the dealer management system 120 may include an accounting system for managing the finances of the dealer, an in-house financing system that allows the dealer to itself provide financing, a digital signature system that allows for the sending of electronic documents using digital signatures, a campaign system for sending advertisements to potential buyers, an extended services contract or warranty system that allows the dealers to manage and provide extended services internally or with third parties, a sticker system that allows the dealers to print stickers such as window stickers, a lead generation system that provide lenders and/or dealers with leads, a credit report system that accesses credit information of the buyers, and so forth.

As used herein, the word module refers to logic embodied in hardware or firmware, or to a collection of software instructions, possibly having entry and exit points. Furthermore, the modules may be written in any programming language such as C, C++, BASIC, Pascal, Java, and FORTRAN compiled and linked into an executable program, installed in a dynamic link library, or may be written in an interpreted programming language such as BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware.

It is also recognized that the term "remote" may include data, objects, devices, components, and/or modules not stored locally, that is not accessible via the local bus. Thus, remote data may include a device which is physically stored in the same room and connected to the user's device via a network. In other situations, a remote device may also be located in a separate geographic area, such as, for example, in a different location, country, and so forth.

Although the foregoing invention has been described in terms of certain preferred embodiments, other embodiments will be apparent to those of ordinary skill in the art from the disclosure herein. Moreover, the described embodiments have been presented by way of example only, and are not intended to limit the scope of the inventions. Indeed, the novel methods and systems described herein may be embodied in a variety of other forms without departing from the spirit thereof. Accordingly, other combinations, omissions, substitutions and modifications will be apparent to the skilled artisan in view of the disclosure herein.

What is claimed is:

1. A computer-based system to assist the closing of a proposed sales transaction of automotive products using a trained operator situated at a call center location remote from a vendor location comprising:
- a camera that captures an image of the trained operator;
- a call center screen at the call center location that displays an image of a customer sent from a vendor computer system;
- an interface module configured to permit selection at the vendor location of a product for the trained operator to sell to the customer remotely from the call center location;
- a processing module configured to determine one or more terms of the transaction; and
- a communications module configured to:
- receive an identifier relating to the proposed transaction from the vendor computer system;
- retrieve information pertaining to the proposed transaction from a dealer management system using the identifier;
- transmit the image of the trained operator to the vendor computer system;
- permit audio communication with the trained operator and the vendor computer system;
- transmit at least some information pertaining to the proposed transaction to a third party;
- receive an indication from the third party that the proposed transaction has been accepted; and
- transmit an instruction for the vendor computer system to print a copy of documents required to complete the transaction.

2. The system of claim 1, wherein the vendor computer system comprises an electronic signature pad for allowing the customer to electronically sign documents.

3. The system of claim 1, wherein the trained operator is trained in regulatory compliance matters.

4. The system of claim 1, wherein the third party is a lender.

5. The system of claim 1, wherein the proposed sales transaction is a purchase of a loan providing purchase money for a vehicle.

6. The system of claim 5, wherein the loan additionally provides purchase money for at least one of a vehicle warranty contract, a GAP insurance contract, an aftermarket vehicle accessory, a vehicle maintenance contract, a vehicle cleaning contract, a theft protection contract, or a vehicle appearance protection product.

7. A computer-based system to assist the closing of a proposed sales transaction of automotive products using a trained operator situated at a call center location remote from a vendor location comprising:
- a camera that captures an image of a customer;
- a vendor screen at the vendor location that displays an image of the trained operator sent from a call center computer system;
- an interface module configured to permit selection at the vendor location of a product for the trained operator to sell to the customer remotely from the call center location; and
- a communications module configured to:
- transmit an identifier relating to the proposed transaction to the call center computer system for retrieval of information pertaining to the proposed transaction using the identifier, wherein at least a portion of the retrieved information used by a third party to accept the proposed transaction;
- transmit the image of the customer to the call center computer system;
- permit audio communication with the customer and the call center computer system; and
- receive an instruction to print a copy of documents required to complete the transaction.

8. The system of claim 7, further comprising an electronic signature pad for allowing the customer to electronically sign documents.

9. The system of claim 7, wherein the trained operator is trained in regulatory compliance matters.

10. The system of claim 7, wherein the proposed sales transaction is a purchase of a loan providing purchase money for a vehicle.

11. The system of claim 10, wherein the loan additionally provides purchase money for at least one of a vehicle warranty contract, a GAP insurance contract, an aftermarket vehicle accessory, a vehicle maintenance contract, a vehicle cleaning contract, a theft protection contract, or a vehicle appearance protection product.

* * * * *